US009885095B2

(12) United States Patent
Tomlinson et al.

(10) Patent No.: US 9,885,095 B2
(45) Date of Patent: Feb. 6, 2018

(54) PROCESS FOR SEPARATION OF AT LEAST ONE METAL SULFIDE FROM A MIXED SULFIDE ORE OR CONCENTRATE

(71) Applicant: Goldcorp Inc., Vancouver, British Columbia (CA)

(72) Inventors: Marcus Tomlinson, Vancouver (CA); Teodoro Martinez, Zacatecas (MX); Simon Hille, Vancouver (CA)

(73) Assignee: GOLDCORP INC., Vancouver, British Columbia (CA)

( * ) Notice: Subject to any disclaimer, the term of this patent is extended or adjusted under 35 U.S.C. 154(b) by 0 days.

(21) Appl. No.: 15/115,142

(22) PCT Filed: Jan. 30, 2015

(86) PCT No.: PCT/CA2015/000050
§ 371 (c)(1),
(2) Date: Jul. 28, 2016

(87) PCT Pub. No.: WO2015/113141
PCT Pub. Date: Aug. 6, 2015

(65) Prior Publication Data
US 2016/0340756 A1 Nov. 24, 2016

Related U.S. Application Data

(60) Provisional application No. 61/934,193, filed on Jan. 31, 2014.

(51) Int. Cl.
| | | |
|---|---|---|
| *C22B 3/00* | (2006.01) | |
| *C22B 3/44* | (2006.01) | |
| *C22B 3/04* | (2006.01) | |
| *C22B 13/00* | (2006.01) | |
| *C22B 15/00* | (2006.01) | |
| *C22B 30/02* | (2006.01) | |
| *C22B 30/04* | (2006.01) | |
| *C22B 1/00* | (2006.01) | |
| *C22B 11/00* | (2006.01) | |
| *B03D 1/002* | (2006.01) | |
| *B03D 1/012* | (2006.01) | |
| *B03D 1/02* | (2006.01) | |

(52) U.S. Cl.
CPC ............... *C22B 3/44* (2013.01); *B03D 1/002* (2013.01); *B03D 1/012* (2013.01); *B03D 1/02* (2013.01); *C22B 1/00* (2013.01); *C22B 3/04* (2013.01); *C22B 11/00* (2013.01); *C22B 13/00* (2013.01); *C22B 13/04* (2013.01); *C22B 15/00* (2013.01); *C22B 15/0065* (2013.01); *C22B 30/02* (2013.01); *C22B 30/04* (2013.01); *B03D 2201/005* (2013.01); *B03D 2201/02* (2013.01); *B03D 2201/04* (2013.01); *B03D 2203/02* (2013.01); *Y02P 10/234* (2015.11)

(58) Field of Classification Search
CPC .. C22B 3/44; C22B 3/42; C22B 30/02; C22B 30/04; C22B 13/04; C22B 15/0065; C22B 11/04; C22B 19/20; C22B 34/22; C22B 43/00; B03D 1/006; B03D 1/002; B03D 1/02; B03D 1/08
USPC .............................. 423/26, 68, 98, 150.1, 109
See application file for complete search history.

(56) References Cited

U.S. PATENT DOCUMENTS

| | | | |
|---|---|---|---|
| 561,168 A | 6/1896 | Kelsey | |
| 793,093 A | 6/1905 | Gardner | |
| 796,849 A | 8/1905 | MacArthur | |
| 975,148 A | 11/1910 | Masson | |
| 2,331,395 A | 10/1943 | Holmes | |
| 2,348,360 A * | 5/1944 | Reed | C22B 3/00 209/164 |
| 3,248,212 A | 4/1966 | Mellgren et al. | |

(Continued)

FOREIGN PATENT DOCUMENTS

| | | |
|---|---|---|
| AU | 200189348 A1 | 11/2001 |
| AU | 2004202612 B8 | 6/2004 |

(Continued)

OTHER PUBLICATIONS

Asbjornsson et al; "Electrochemical Behaviour and Surface Characterisation of Tennantite in 0.1 M HCl"; International Symposium on Electrochemistry in Mineral and Metal Processing; 2003; pp. 37-47.
Universidad de Concepcion-Chile; Electrochemicl Society Proceedings; 2003; pp. 27-36.
Castro et al; "Study of the Surface Properties of Enargite as a Function of pH"; International Journal of Mineral Processing; Jun. 8, 2005; pp. 104-115.
Castro et al; "Depression of Enargite by Magnesium-Ammonium Mixtures"; Mineral Processing: Proceedings of the Copper 2003— Cobre 2003; Nov. 30, 2003; pp. 256-269.
Chryssoulis et al; Behaviour of Tetrahedrite in the Mill Circuits of Brunswick Mining and Smelting Corporation, Ltd.; The Institution of Mining and Metallurgy; 1998; pp. 203-217.

(Continued)

*Primary Examiner* — Steven Bos
(74) *Attorney, Agent, or Firm* — Ohandlt, Greeley, Ruggiero & Perle, LLP

(57) ABSTRACT

A process is provided for separation of at least one metal sulfide from a mixed sulfide concentrate. The process includes: subjecting the mixed sulfide concentrate to flotation in which at least one sulfide including antimony, arsenic and a first metal is floated and at least one sulfide including a second metal is depressed. The flotation yields a first metal concentrate having the at least one sulfide including antimony, arsenic and the first metal and a second metal concentrate having the at least one sulfide including the second metal. The first metal concentrate is leached to yield a further concentrate and a leach solution. The further concentrate includes the first metal and the leach solution includes soluble antimony and soluble arsenic. The process further includes oxidizing the leach solution to yield an antimony precipitate and an arsenic solution, and forming a stable arsenic compound from the arsenic solution.

61 Claims, 13 Drawing Sheets

(56) References Cited

U.S. PATENT DOCUMENTS

| | | | |
|---|---|---|---|
| 3,657,081 A | 4/1972 | Holmes | |
| 3,709,680 A | 1/1973 | Holmes et al. | |
| 3,883,345 A | 5/1975 | Caldon et al. | |
| 3,911,078 A * | 10/1975 | Nadkarni | C01G 28/002 |
| | | | 423/27 |
| 4,017,369 A | 4/1977 | Lindström | |
| 4,022,866 A | 5/1977 | Kuhn et al. | |
| 4,029,741 A * | 6/1977 | Coltrinari | C01G 30/002 |
| | | | 423/179 |
| 4,051,220 A | 9/1977 | Coltrinari | |
| 4,081,364 A | 3/1978 | Lepetic | |
| 4,078,917 A | 5/1978 | Swanson | |
| 4,096,232 A | 6/1978 | Vogt | |
| 4,118,234 A | 10/1978 | Jans | |
| 4,225,571 A | 9/1980 | de Denus | |
| 4,244,927 A | 1/1981 | Reynolds et al. | |
| 4,495,159 A | 1/1985 | Maurel | |
| 4,610,723 A | 9/1986 | Nogueira et al. | |
| 4,681,675 A | 7/1987 | Bresson et al. | |
| 4,699,711 A | 10/1987 | Bergman et al. | |
| 4,702,821 A | 10/1987 | Bresson et al. | |
| 4,789,392 A | 12/1988 | Klimpel et al. | |
| 4,797,202 A | 1/1989 | Klimpel et al. | |
| 4,822,483 A | 4/1989 | Klimpel et al. | |
| 4,891,067 A | 1/1990 | Rappas et al. | |
| 5,057,209 A | 10/1991 | Klimpel et al. | |
| 5,137,640 A | 8/1992 | Poncha | |
| 5,171,428 A | 12/1992 | Beattie et al. | |
| 5,182,014 A | 1/1993 | Goodman | |
| 5,234,318 A | 8/1993 | Brandon | |
| 5,290,338 A * | 3/1994 | Anderson | C01G 30/00 |
| | | | 423/87 |
| 5,750,019 A | 5/1998 | Olper | |
| 6,030,537 A | 2/2000 | Shanuik et al. | |
| 6,032,805 A | 3/2000 | Clark et al. | |
| 6,036,025 A | 3/2000 | Clark et al. | |
| 6,042,731 A | 3/2000 | Bonnin | |
| 6,092,666 A | 7/2000 | Clark et al. | |
| 6,106,726 A | 8/2000 | Fujita et al. | |
| 6,132,623 A | 10/2000 | Nikolaidis et al. | |
| 6,145,667 A | 11/2000 | Rothenberg et al. | |
| 6,168,721 B1 | 1/2001 | Sugita et al. | |
| 6,170,669 B1 | 1/2001 | Senior et al. | |
| 6,197,201 B1 | 3/2001 | Misra et al. | |
| 6,200,482 B1 | 3/2001 | Winchester et al. | |
| 6,248,301 B1 | 6/2001 | Hannaford et al. | |
| 6,254,312 B1 | 7/2001 | Chowdhury et al. | |
| 6,280,500 B1 | 8/2001 | Ma et al. | |
| 6,302,942 B1 | 10/2001 | Ma et al. | |
| 6,319,389 B1 | 11/2001 | Fountain et al. | |
| 6,342,189 B1 | 1/2002 | Sundkvist | |
| 6,368,510 B2 | 4/2002 | Friot | |
| 6,383,255 B1 | 5/2002 | Sundkvist | |
| 6,387,276 B1 | 5/2002 | Nikolaidis et al. | |
| 6,390,303 B1 | 5/2002 | Clark et al. | |
| 6,398,968 B1 | 6/2002 | Higby | |
| 6,406,676 B1 | 6/2002 | Sundkvist | |
| 6,409,022 B1 | 6/2002 | Rothenberg et al. | |
| 6,427,843 B1 | 8/2002 | Clark | |
| 6,461,535 B1 | 10/2002 | de Esparza | |
| 6,461,577 B1 | 10/2002 | Lindström et al. | |
| 6,482,373 B1 | 11/2002 | Hannaford et al. | |
| 6,484,883 B1 | 11/2002 | Edelstein | |
| 6,495,024 B1 | 12/2002 | Lindroos et al. | |
| 6,543,964 B2 | 4/2003 | Chowdhury et al. | |
| 6,562,241 B1 | 5/2003 | Gritton et al. | |
| 6,568,537 B1 | 5/2003 | Schelkunov et al. | |
| 6,599,429 B1 | 7/2003 | Azizian | |
| 6,613,230 B2 | 9/2003 | Krulik et al. | |
| 6,656,722 B1 | 12/2003 | Ruitenberg et al. | |
| 6,706,195 B2 | 3/2004 | Jensen et al. | |
| 6,732,867 B2 | 5/2004 | Magliocco et al. | |
| 6,739,454 B2 | 5/2004 | Rothenberg et al. | |
| 6,763,732 B1 | 7/2004 | Saastamoinen et al. | |
| 6,764,847 B2 | 7/2004 | Banfield et al. | |
| 6,786,336 B2 | 9/2004 | Boddu et al. | |
| 6,787,041 B2 | 9/2004 | Chwirka | |
| 6,790,363 B2 | 9/2004 | Vempati | |
| 6,802,980 B1 | 10/2004 | Khandaker et al. | |
| 6,820,746 B2 | 11/2004 | Magliocco et al. | |
| 6,821,434 B1 | 11/2004 | Moore et al. | |
| 6,824,690 B1 | 11/2004 | Zhao et al. | |
| 6,827,220 B1 | 12/2004 | Young et al. | |
| 6,830,695 B1 | 12/2004 | Brady et al. | |
| 6,843,617 B2 | 1/2005 | Chowdhury et al. | |
| 6,921,732 B2 | 1/2005 | Vempati | |
| 6,849,187 B2 | 2/2005 | Shaniuk | |
| 6,863,825 B2 | 3/2005 | Witham et al. | |
| 6,878,286 B2 | 4/2005 | Jensen et al. | |
| 6,889,844 B1 | 5/2005 | Manlapig et al. | |
| 6,988,623 B2 | 1/2006 | Magliocco et al. | |
| 7,004,326 B1 | 2/2006 | Dai et al. | |
| 7,011,216 B2 | 3/2006 | Magliocco et al. | |
| 7,014,048 B2 | 3/2006 | Anglerot et al. | |
| 7,041,223 B2 | 5/2006 | Jensen et al. | |
| 7,045,066 B2 | 5/2006 | Lee et al. | |
| 7,048,853 B2 | 5/2006 | Witham et al. | |
| 7,051,881 B2 | 5/2006 | Hesse et al. | |
| 7,066,982 B2 | 6/2006 | Ma et al. | |
| 7,069,690 B2 | 7/2006 | Ma et al. | |
| 7,104,404 B2 | 9/2006 | Rau et al. | |
| 7,150,357 B2 | 12/2006 | Rodopoulos et al. | |
| 7,152,741 B2 | 12/2006 | Jara et al. | |
| 7,165,680 B2 | 1/2007 | Rajic et al. | |
| 7,232,554 B2 | 6/2007 | Videla et al. | |
| 7,247,242 B1 | 7/2007 | Moore et al. | |
| 7,279,103 B2 | 10/2007 | Burckle et al. | |
| 7,300,589 B2 | 11/2007 | Witham et al. | |
| 7,314,604 B1 | 1/2008 | Harvey et al. | |
| 7,335,662 B2 | 2/2008 | Hurley et al. | |
| 7,389,881 B2 | 6/2008 | Andreatidis et al. | |
| 7,435,405 B2 | 10/2008 | Tanaka et al. | |
| 7,461,745 B2 | 12/2008 | Young et al. | |
| 7,476,311 B2 | 1/2009 | Litz et al. | |
| 7,553,984 B2 | 6/2009 | Rau et al. | |
| 7,615,199 B2 | 11/2009 | Poijärvi et al. | |
| 7,686,976 B2 | 3/2010 | Witham et al. | |
| 7,695,634 B2 | 4/2010 | Hesse et al. | |
| 7,695,698 B2 | 4/2010 | Fujita et al. | |
| 7,789,332 B2 | 9/2010 | Heimala et al. | |
| 8,066,874 B2 | 11/2011 | Burba, III et al. | |
| 8,092,764 B2 | 1/2012 | Abumiya et al. | |
| 8,092,765 B2 | 1/2012 | Abumiya et al. | |
| 8,147,779 B2 | 4/2012 | Abuyima et al. | |
| 8,277,539 B2 | 10/2012 | Dixon et al. | |
| 8,277,633 B2 | 10/2012 | Kimura et al. | |
| 8,475,656 B1 | 7/2013 | Neumann | |
| 2002/0003116 A1 | 1/2002 | Golden | |
| 2002/0036172 A1 | 3/2002 | Del Signore | |
| 2002/0053259 A1 | 5/2002 | Ma et al. | |
| 2002/0125195 A1 | 9/2002 | Jensen et al. | |
| 2003/0062306 A1 | 4/2003 | Perriello | |
| 2003/0089665 A1 | 5/2003 | Shaniuk | |
| 2003/0116504 A1 | 6/2003 | Vempati | |
| 2003/0165359 A1 | 9/2003 | Chowdhury et al. | |
| 2004/0007536 A1 | 1/2004 | Videla et al. | |
| 2004/0262201 A1 | 12/2004 | Palosaari | |
| 2005/0131403 A1 | 7/2005 | Simms | |
| 2006/0005665 A1 | 1/2006 | Luo | |
| 2006/0037437 A1 | 2/2006 | Wenzhou | |
| 2006/0173083 A1 | 8/2006 | Klipper et al. | |
| 2006/0207945 A1 | 9/2006 | Witham et al. | |
| 2006/0217585 A1 | 9/2006 | Forrester | |
| 2006/0273014 A1 | 12/2006 | Klipper et al. | |
| 2007/0028721 A1 | 2/2007 | Bowker et al. | |
| 2007/0253877 A1 | 11/2007 | Fujita et al. | |
| 2007/0261998 A1 | 11/2007 | Crane | |
| 2007/0262023 A1 | 11/2007 | Reddy | |
| 2008/0152558 A1 | 6/2008 | Hultholm et al. | |
| 2008/0173132 A1 | 7/2008 | Dunn et al. | |
| 2008/0185317 A1 | 8/2008 | Nagaraj | |
| 2008/0308466 A1 | 12/2008 | Lumsden | |
| 2008/0308468 A1 | 12/2008 | Verster | |
| 2009/0019970 A1 | 1/2009 | Ritchie et al. | |

(56) References Cited

U.S. PATENT DOCUMENTS

| | | | |
|---|---|---|---|
| 2009/0038440 A1 | 2/2009 | Hamalainen et al. | |
| 2009/0078584 A1 | 3/2009 | Kimura et al. | |
| 2009/0104107 A1 | 4/2009 | Kimura et al. | |
| 2009/0293680 A1 | 12/2009 | Ritchie et al. | |
| 2009/0317313 A1 | 12/2009 | Bradshaw et al. | |
| 2010/0021370 A1 | 1/2010 | Nagaraj et al. | |
| 2010/0044280 A1 | 2/2010 | Viljoen et al. | |
| 2010/0071510 A1* | 3/2010 | Beckmann | C22B 1/06 75/645 |
| 2010/0100510 A1 | 4/2010 | Balaban et al. | |
| 2010/0175509 A1 | 7/2010 | Abumiya et al. | |
| 2010/0187178 A1 | 7/2010 | Burba et al. | |
| 2010/0196230 A1 | 8/2010 | Abumiya et al. | |
| 2010/0196231 A1 | 8/2010 | Abumiya et al. | |
| 2010/0199808 A1 | 8/2010 | Kohr | |
| 2010/0215570 A1 | 8/2010 | Abumiya et al. | |
| 2010/0233050 A1 | 9/2010 | Gargulak et al. | |
| 2010/0266484 A1 | 10/2010 | Abumiya et al. | |
| 2011/0020198 A1 | 1/2011 | Canady et al. | |
| 2011/0056331 A1 | 3/2011 | Dixon et al. | |
| 2011/0094942 A1 | 4/2011 | Ochi et al. | |
| 2011/0155651 A1 | 6/2011 | Gorain | |
| 2011/0309029 A1 | 12/2011 | Ruonala et al. | |
| 2012/0027652 A1 | 2/2012 | Dreisinger | |
| 2012/0045382 A1 | 2/2012 | Inoue et al. | |
| 2012/0138528 A1 | 6/2012 | Burba, III et al. | |
| 2012/0138529 A1 | 6/2012 | Burba, III et al. | |
| 2012/0138530 A1 | 6/2012 | Burba, III et al. | |
| 2012/0279357 A1 | 11/2012 | Dixon et al. | |
| 2012/0285893 A1 | 11/2012 | Moore et al. | |
| 2013/0004389 A1 | 1/2013 | Okamoto et al. | |
| 2014/0017152 A1 | 1/2014 | Nako et al. | |

FOREIGN PATENT DOCUMENTS

| | | |
|---|---|---|
| AU | 2007284003 A1 | 2/2008 |
| AU | 2008276969 A1 | 7/2008 |
| AU | 2008201799 A1 | 11/2008 |
| AU | 2009101298 B4 | 12/2009 |
| BG | 109171 A | 12/2006 |
| CN | 1031197 A | 2/1989 |
| CN | 1308988 A | 8/2001 |
| CN | 1317371 A | 10/2001 |
| CN | 1403206 A | 3/2003 |
| CN | 1411910 A | 4/2003 |
| CN | 1546239 A | 11/2004 |
| CN | 1562493 A | 1/2005 |
| CN | 1603433 A | 4/2005 |
| CN | 1704170 A | 12/2005 |
| CN | 1752236 A | 3/2006 |
| CN | 1817488 A | 8/2006 |
| CN | 1943870 A | 4/2007 |
| CN | 101033507 A | 9/2007 |
| CN | 101041498 A | 9/2007 |
| CN | 101082079 A | 12/2007 |
| CN | 101138750 A | 3/2008 |
| CN | 101168450 A | 4/2008 |
| CN | 101190427 A | 6/2008 |
| CN | 101195110 A | 6/2008 |
| CN | 101199950 A | 6/2008 |
| CN | 101200776 A | 6/2008 |
| CN | 101219415 A | 7/2008 |
| CN | 101254484 A | 9/2008 |
| CN | 101285126 A | 10/2008 |
| CN | 101293221 A | 10/2008 |
| CN | 101343686 A | 1/2009 |
| CN | 101362114 A | 2/2009 |
| CN | 101386915 A | 3/2009 |
| CN | 101402071 A | 4/2009 |
| CN | 101403041 A | 4/2009 |
| CN | 101417266 A | 4/2009 |
| CN | 101451185 A | 6/2009 |
| CN | 101455996 A | 6/2009 |
| CN | 101492770 A | 7/2009 |
| CN | 101497061 A | 8/2009 |
| CN | 1015088479 A | 8/2009 |
| CN | 101524669 A | 9/2009 |
| CN | 101537387 A | 9/2009 |
| CN | 101797535 A | 8/2010 |
| CN | 101817553 A | 9/2010 |
| CN | 101817553 B | 3/2012 |
| CN | 102628108 A | 8/2012 |
| CN | 102676809 A | 9/2012 |
| CN | 102989590 A | 3/2013 |
| DE | 360429 C | 10/1922 |
| EP | 1770819 A1 | 4/2007 |
| FR | 2474529 A1 | 7/1981 |
| GB | 407963 A | 3/1934 |
| GB | 432105 A | 7/1935 |
| IN | 206913 | 5/2007 |
| JP | 60-147266 * | 8/1985 |
| JP | 60147266 A | 8/1985 |
| JP | 2000104124 A | 4/2000 |
| JP | 2001327979 A | 11/2001 |
| JP | 2002193619 A | 7/2002 |
| JP | 2005103429 A | 4/2005 |
| JP | 2006116468 A | 5/2006 |
| JP | 2006239553 A | 9/2006 |
| JP | 2006328498 A | 12/2006 |
| JP | 2008150658 A | 7/2008 |
| JP | 2008150659 A | 7/2008 |
| JP | 4353731 B2 | 10/2009 |
| MX | PA01013311 A | 7/2002 |
| MX | 02010119 A | 4/2004 |
| MX | PA05007988 A | 1/2006 |
| PL | 177937 * | 3/1995 |
| PL | 191626 B1 | 6/2006 |
| PL | 195693 B1 | 10/2007 |
| PL | 392598 A1 | 4/2012 |
| PL | 224047 B1 | 11/2016 |
| RO | 123221 B1 | 3/2011 |
| RU | 2149689 C1 | 5/2000 |
| RU | 2149710 C1 | 5/2000 |
| RU | 2151010 C1 | 6/2000 |
| RU | 2164825 C1 | 4/2001 |
| RU | 2179595 C2 | 2/2002 |
| RU | 2192313 C1 | 11/2002 |
| RU | 2215588 C1 | 11/2003 |
| RU | 2226562 C2 | 4/2004 |
| RU | 2235602 C1 | 9/2004 |
| RU | 2236907 C1 | 9/2004 |
| RU | 2248248 C1 | 3/2005 |
| RU | 2004100923 A | 6/2005 |
| RU | 2260068 C1 | 9/2005 |
| RU | 2004136544 A | 5/2006 |
| RU | 2291909 A | 1/2007 |
| RU | 2316606 C1 | 2/2008 |
| RU | 2323988 C2 | 5/2008 |
| RU | 2007114008 A | 10/2008 |
| RU | 2007114009 A | 10/2008 |
| RU | 2007113933 A | 11/2008 |
| RU | 2007123433 A | 12/2008 |
| RU | 2349389 A | 3/2009 |
| RU | 2352401 C2 | 4/2009 |
| RU | 2360016 C1 | 6/2009 |
| RU | 2379116 C1 | 1/2010 |
| RU | 2389557 C1 | 5/2010 |
| RU | 2397025 C1 | 8/2010 |
| RU | 2397816 C1 | 8/2010 |
| RU | 2400308 C1 | 9/2010 |
| RU | 2410454 C1 | 1/2011 |
| RU | 2425720 C1 | 8/2011 |
| RU | 2426598 C1 | 8/2011 |
| RU | 2456357 C1 | 7/2012 |
| SU | 774602 A1 | 10/1980 |
| WO | 199108318 A1 | 6/1991 |
| WO | 199304783 A1 | 3/1993 |
| WO | 200006502 A1 | 2/2000 |
| WO | 200009268 A1 | 2/2000 |
| WO | 200015346 A1 | 3/2000 |
| WO | 200061822 A1 | 10/2000 |
| WO | 200078402 A1 | 12/2000 |
| WO | 200101080 A1 | 1/2001 |

(56) References Cited

FOREIGN PATENT DOCUMENTS

| | | |
|---|---|---|
| WO | 200110560 A1 | 2/2001 |
| WO | 200123628 A1 | 4/2001 |
| WO | 200162360 A2 | 8/2001 |
| WO | 200162670 A1 | 8/2001 |
| WO | 200204358 A1 | 1/2002 |
| WO | 200204361 A1 | 1/2002 |
| WO | 200210122 A1 | 2/2002 |
| WO | 200229007 A2 | 4/2002 |
| WO | 200238277 A2 | 5/2002 |
| WO | 200238505 A1 | 5/2002 |
| WO | 200248046 A2 | 6/2002 |
| WO | 2002066168 A1 | 8/2002 |
| WO | 2002092234 A1 | 11/2002 |
| WO | 2003002462 A1 | 1/2003 |
| WO | 2003026771 A1 | 4/2003 |
| WO | 2003026801 A1 | 4/2003 |
| WO | 2003043731 A1 | 5/2003 |
| WO | 2003049867 A1 | 6/2003 |
| WO | 2003070869 A1 | 8/2003 |
| WO | 2004014562 A2 | 2/2004 |
| WO | 2004035218 A1 | 4/2004 |
| WO | 2004059018 A1 | 7/2004 |
| WO | 2004067452 A1 | 8/2004 |
| WO | 2004080599 A1 | 9/2004 |
| WO | 2004101834 A2 | 11/2004 |
| WO | 2004110623 A1 | 12/2004 |
| WO | 2005028376 A1 | 3/2005 |
| WO | 2005113152 A1 | 12/2005 |
| WO | 2006037206 A1 | 4/2006 |
| WO | 2006084950 A1 | 8/2006 |
| WO | 2006095325 A2 | 9/2006 |
| WO | 2006117424 A1 | 11/2006 |
| WO | 2007024517 A2 | 3/2007 |
| WO | 2007045034 A1 | 4/2007 |
| WO | 2007059559 A1 | 5/2007 |
| WO | 2007073460 A1 | 6/2007 |
| WO | 2007086003 A2 | 8/2007 |
| WO | 2007109841 A1 | 10/2007 |
| WO | 2007115377 A1 | 10/2007 |
| WO | 2008-019451 * | 2/2008 |
| WO | 2008020311 A2 | 2/2008 |
| WO | 2008059439 A1 | 5/2008 |
| WO | 2008068309 A1 | 6/2008 |
| WO | 2008082952 A3 | 7/2008 |
| WO | 2008-092995 * | 8/2008 |
| WO | 2009-011320 * | 1/2009 |
| WO | 2013173914 A1 | 11/2013 |

OTHER PUBLICATIONS

Cordova et al; "An Electrochemical Study of Enargite in Aqueous Solutions by Transient Techniques"; Electrochemical Proceedings; vol. 96-6; 1996; pp. 357-367.

Fornasiero et al; "Separation of Enargite and Tennantite from Non-Arsenic Copper Sulfide Minerals by Selective Oxidation or Dissolution"; International Journal of Mineral Processing; Jul. 19, 2000; pp. 109-119.

Guo et al; "Electrochemical Investigation on Wettability of Enargite"; Met Soc; Aug. 26, 2001; pp. 323-337.

Haga et al; "Seperation of Enargite from Cu-Concentrate"; International Mineral Processing Congress (IMPC); Sep. 24, 2012; pp. 1-11.

Jamie Correa Perez; "Mining and Concentrating Practice at the San Martin Unit of I.M.M.S.A.: Production of Copper and Zinc Concentrates from Complex Sulphide Ores"; Industrial Minera Mexico. S.A. de C.V., Mexico; 1988; pp. 175-181.

Kappes et al; "The Metallurgical Development of an Enargite-Bearing Deposit"; International Mineral Processing Congress (IMPC); Sep. 6, 2010; pp. 2035-2047.

Laajalehto et al; "Studies of the Effect of Antimony Impurity on the Flotation Behaviour of Galena"; International Journal of Mineral Processing; Feb. 25, 1991; pp. 95-102.

Lager et al; "Seperation of Antimony Mineral Impurities from Complex Sulphide Ores"; Institution of Mining and Metallurgy; Jan. 1990; pp. 54-61.

Lahiri et al; "Recovery of Silver from the Multi-Metal Sulphide Ore at Rajpura-Dariba Mine, India"; Institution of Mining and Metallurgy; 1988; pp. 191-205.

Long et al; "A Review of Copper-Arsenic Mineral Removal from Copper Concentrates"; Minerals Engineering; May 2012; pp. 179-186.

Plackowski et al; "A Critical Reveiw of Surface Properties and Selective Flotation of Enargite in Sulphide Systems"; Minerals Engineering; Mar. 3, 2012; pp. 1-11.

Senior et al; "The Selective Flotation of Enargite from other Copper Mineral—A Single Mineral Study in Relation to Benefication of the Tampakan Deposit in the Philippines"; International Journal of Mineral Processing; Jul. 31, 2006; pp. 1-12.

Shibayama et al; "Selective Arsenic and Antimony Removal by Alkaline Leaching and Precepitation from Enargite and Tennantite/Tetrahedrite Ore"; International Mineral Processing Congress (IMPC); Sep. 24, 2012; pp. 1-14.

Shibayama et al; "Removal of Arsenic in Enargite from Copper Ores by Flotation and Leaching in NAHS Media"; International Mineral Processing Congress (IMPC); Sep. 6, 2010; pp. 1603-1611.

Petruk et al; "The Behaviour of Galena, Chalcopyrite and Tetrahedrite During Flotation of a Fine-Grained Base Metal Ore in the Concentrator of Brunswick Mining and Smelting Limited"; Brunswick Mining and Smelting; 1981; pp. 1-12.

Stan Dayton; "Equity Silver on Line with Leach Plant: How Sb and As are Purged from a High-Silver Coper Concentrate Before Smelting"; Minable Ore Reserves Equity Silver Mines Ltd.; Dec. 31, 1980; pp. 1-6.

International Search Report dated May 4, 2015 for PCT application No. PCT/CA2015/000050.

Written Opinion dated May 4, 2015 for PCT application No. PCT/CA2015/000050.

Dayton, Stan; "Equity Silver on Line with Leach Plant—How Sb and As are Purged from a High-Silver Copper Concentrate Before Smelting"; Engineering & Mining; 1982; 6 pages.

Canadian Office Action dated Jul. 26, 2017 for Canadian application No. 2,952,568.

Awe et al; "Selective Leaching of Arsenic and Antimony from a Tetrahedrite Rich Complex Sulphide Concentrate using Alkaline Sulphide Solution"; Minerals Engineering—Elsevier; Sep. 16, 2010; pgs. 1227-1236.

Reddy et al; "Arsenic Metallurgy Fundamentals and Applications"; The Metallurgical Society, Inc.; Jan. 1988; pgs. 1-29.

European Search Report dated Oct. 10, 2017 for European application No. 15743344.2.

* cited by examiner

_US 9,885,095 B2_

PROCESS FOR SEPARATION OF AT LEAST ONE METAL SULFIDE FROM A MIXED SULFIDE ORE OR CONCENTRATE

CROSS-REFERENCE TO RELATED APPLICATIONS

The present application is a national stage application of PCT Patent Application No. PCT/CA2015/000050, filed Jan. 30, 2015, which claims priority to U.S. Provisional Patent Application Ser. No. 61/934,193, filed Jan. 31, 2014, the contents of each of which are hereby incorporated by reference in their entireties.

BACKGROUND OF THE DISCLOSURE

1. Field of the Disclosure

The subject application relates generally to processing of metal ores or concentrates, and in particular to a process for separation of at least one metal sulfide from such ores or concentrates.

2. Description of the Related Art

Metallurgical processes are applied to metal ore deposits and such processes can be categorized into three general areas: leaching, solution concentration and purification, and metal recovery.

Such processes have been previously described. For example, U.S. Pat. No. 3,709,680 to Holmes et al. (1973) is directed to leaching a copper concentrate prepared by flotation using a hot concentrated caustic solution.

U.S. Pat. No. 3,911,078 to Nadkarni et al. (1975) is directed to a method for removing chemically bonded arsenic and antimony from copper sulfide ores.

U.S. Pat. No. 4,017,369 to Lindstrom (1977) is directed to the recovery of the antimony, arsenic, mercury and tin from alkaline leach solutions by electrowinning.

U.S. Pat. No. 4,051,220 to Coltrinari (1977) is directed to a process for treating mixed metal sulfides containing trivalent antimony sulfide. The process involves leaching with sodium sulfide to isolate copper sulfide as an insoluble solid. Following leaching, antimony and arsenic values are oxidized.

U.S. Pat. No. 5,137,640 to Poncha (1992) is directed to a process for reducing arsenic levels in a solution containing sulfuric acid, water, and arsenic acid by adding copper or a copper-containing compound to the solution to form dissolved copper arsenate, adding alkali solution to precipitate the copper arsenate and to neutralize arsenic and sulfuric acid.

U.S. Pat. No. 5,290,338 to Anderson et al. (1994) is directed to an antimony recovery process in which an antimony-containing material is leached in a solvent including elemental sulfur and caustic.

U.S. Pat. No. 5,750,019 to Olper (1998) is directed to a hydrometallurgical and electrochemical process for processing sulfur antimony ores and residues, the end products from which are electrolytic antimony and elemental sulfur.

Most of the economically significant base metal ore deposits worldwide contain mixed sulfides. Several types of mixed sulfide ores and concentrates may contain relatively large quantities of lead sulfide together with sulfides of other metals, such as copper, antimony and arsenic. Known metallurgical processes do not provide satisfactory metal sulfide separation from such ores and concentrates. It is desirable that certain metal sulfides be separated and recovered from ores and concentrates and converted, if necessary, to a form suitable for commercial sale, while other more deleterious elements (e.g. other metals/metal compounds) may be removed. Deleterious elements are understood to mean elements that are considered commercially deleterious and therefore, can vary widely depending on the commercial application. It is also desirable that the cost of separation of at least one metal sulfide and/or removing deleterious elements from the concentrate at or near the mine be kept low.

Accordingly, there is a need for an improved process for separation of at least one metal sulfide from a mixed sulfide ore or concentrate.

SUMMARY OF THE DISCLOSURE

Accordingly, in one aspect there is provided a process for separation of at least one metal sulfide from a mixed sulfide concentrate, the mixed sulfide concentrate having at least one sulfide comprising antimony, arsenic and at least two metals, the at least two metals comprising a first metal and a second metal, the process comprising: subjecting the mixed sulfide concentrate to flotation in which at least one sulfide comprising antimony, arsenic and the first metal is floated and at least one sulfide comprising the second metal is depressed, the flotation yielding a first metal concentrate and a second metal concentrate, the first metal concentrate having the at least one sulfide comprising antimony, arsenic and the first metal, and the second metal concentrate having the at least one sulfide comprising the second metal; leaching the first metal concentrate to yield a further metal concentrate and a leach solution, the further metal concentrate comprising the first metal and the leach solution comprising soluble antimony and soluble arsenic; and one of: (i) oxidizing the leach solution to yield an antimony precipitate and an arsenic solution; (ii) forming a stable arsenic compound from the leach solution; and (iii) oxidizing the leach solution to yield an antimony precipitate and an arsenic solution, and forming a stable arsenic compound from the arsenic solution.

The leach solution may be oxidized to yield the antimony precipitate and the arsenic solution, and the stable arsenic compound is formed from the arsenic solution. The antimony and arsenic may be present in the mixed sulfide concentrate in a molar ratio of about 0.5:1 to about 1.5:1. The antimony and arsenic may be present in the mixed sulfide concentrate in a molar ratio of about 1:1.

The mixed sulfide concentrate may comprise the at least two metals, and a major amount of arsenic relative to antimony. The mixed sulfide concentrate may comprise the at least two metals, and a major amount of antimony relative to arsenic.

The arsenic solution may have an As:Sb concentration ratio of about 10:1 to about 500:1, typically about 20:1 to about 200:1, and more typically about 50:1 to about 100:1.

The first metal and the second metal may be different metals. The first metal and the second metal may be the same metal. The first metal and the second metal may be selected from the group consisting of copper, lead, silver, iron, mercury, zinc, and vanadium. The first metal may be copper and the second metal may be lead.

Subjecting the mixed sulfide concentrate to flotation may comprise using one or more of a sulfite salt and a caustic starch solution.

The second metal concentrate may have at least about 50% of the original antimony, the arsenic, and the first metal content of the mixed sulfide concentrate removed. The second metal concentrate may have about 60% to about 90% of the original antimony, arsenic, and the first metal content of the mixed sulfide concentrate removed. The first metal concentrate may have at least about 50% of the original second metal content of the mixed sulfide concentrate removed. The first metal concentrate may have about 65% to about 98% of the original second metal content of the mixed sulfide concentrate removed. The further metal concentrate may have at least about 75% of the original antimony and arsenic content of the mixed sulfide concentrate removed. The further metal concentrate may have about 80% to about 95% of the original antimony and arsenic content of the mixed sulfide concentrate removed.

The process may further comprise: washing solids remaining after the leaching to yield a first wash solution. The process may further comprise: acidifying the first wash solution to form a precipitate and to yield a first wash slurry; and separating the precipitate from the first wash slurry to yield a second wash solution. The process may further comprise: acidifying the second wash solution to precipitate arsenic and antimony species as a slurry; separating the precipitated arsenic and antimony species; and leaching the precipitated arsenic and antimony species with the first metal concentrate during the leaching. The process may further comprise: prior to the acidifying, oxidizing the first wash solution so as to oxidize $As^{3+}$ to $As^{5+}$ and $Sb^{3+}$ to $Sb^{5+}$. The process may further comprise: leaching the precipitate with the first metal concentrate during the leaching.

The oxidizing the leach solution may comprise oxidizing the soluble arsenic and antimony in the leach solution to yield soluble antimony and arsenic thiosalts. The oxidizing the soluble antimony and arsenic in the leach solution may comprise oxidizing with elemental sulfur. The process may further comprise determining an oxidation end point by at least one of wavelength monitoring and oxidation reduction potential (ORP) monitoring. The process may further comprise removing the soluble antimony and arsenic thiosalts from the leach solution by crystallization. The process may further comprise recovering the leach solution for recycling. The removing may comprise cooling the leach solution to induce the crystallization. The cooling may be controlled to avoid crystallization of alkali metal sulfide. The crystallization may comprise forming thioarsenate and thioantimonate salts. The process may further comprise dissolving crystals formed by the crystallization to yield the soluble antimony and arsenic thiosalts. The further metal concentrate may be washed to yield a wash solution, the dissolving comprises dissolving the crystals in the wash solution.

The process may further comprise oxidizing the soluble antimony and arsenic thiosalts to yield the antimony precipitate and the arsenic solution. The oxidizing the soluble antimony and arsenic thiosalts may comprise using an oxidizing agent. The oxidizing agent may be hydrogen peroxide and/or a metal catalyzed hydroquinone. The oxidizing the soluble antimony and arsenic thiosalts may be carried out at about atmospheric pressure. The process may further comprise: prior to the oxidizing the soluble antimony and arsenic thiosalts, acidifying a solution comprising the soluble antimony and arsenic thiosalts to precipitate arsenic and antimony species as a slurry; and dissolving the precipitated arsenic and antimony species through addition of base to the slurry, wherein the oxidizing comprises oxidizing the dissolved arsenic and antimony species. The process may further comprise: prior to the oxidizing the soluble antimony and arsenic thiosalts, acidifying a solution comprising the soluble antimony and arsenic thiosalts to precipitate an additional antimony sulfide product as a slurry; separating the additional antimony sulfide product from the slurry; acidifying the slurry to precipitate arsenic and antimony species; and dissolving the precipitated arsenic and antimony species through addition of base to the slurry, wherein the oxidizing comprises oxidizing the dissolved arsenic and antimony species. The additional antimony sulfide product may comprise antimony pentasulfide. Hydrogen sulfide gas may be produced, and the hydrogen sulfide gas be passed through a caustic scrubber. A sodium sulfide product or a sodium hydrosulfide product may be formed. The process may further comprise combining the sodium sulfide product or the sodium hydrosulfide product with leach reagents during the leaching.

The antimony precipitate may comprise sodium antimony hydroxide.

The arsenic solution may comprise soluble arsenate.

The forming further comprises returning a portion of the stable arsenic compound to the forming to act as precipitation seed material during the forming.

The process may further comprise, prior to the forming: acidifying the arsenic solution to decompose thiosulfates, to yield an acidified solution; oxidizing the acidified solution to oxidize residual $As^{3+}$ to $As^{5+}$ and reduced sulfur species to sulfates, to yield a slurry comprising elemental sulfur; separating elemental sulfur from the slurry to yield a liquid; and oxidizing the liquid to oxidize residual reduced sulfur species, to yield an oxidized solution, wherein the forming comprises forming the stable arsenic compound from the oxidized solution. The process may further comprise using the elemental sulfur as an oxidizing agent for the oxidizing of the leach solution.

The process may further comprise, prior to the forming: oxidizing the arsenic solution to oxidize residual $As^{3+}$ to $As^{5+}$ and reduced sulfur species to sulfates, to yield an oxidized solution; and acidifying the oxidized solution to yield an acidified oxidized solution, wherein forming comprises forming the stable arsenic compound from the acidified oxidized solution.

The stable arsenic compound may comprise ferric arsenate. The stable arsenic compound may be compliant with toxic characteristic leaching procedure (TCLP) standards.

The at least one sulfide comprising antimony, arsenic and at least two metals may comprise sulfosalts. The sulfosalts may comprise at least one of sulfarsenites, sulfarsenates, sulfantimonites, sulfantimonates and sulfosalts of SnS archetype. The sulfosalts may comprise at least one of: tetrahedrite, tennantite, enargite, bournonite, famatinite, and jamesonite.

The second metal concentrate may be substantially free of antimony, arsenic and the first metal. The further metal concentrate may be substantially free of antimony and arsenic.

In another aspect, there is provided a process for separation of at least one metal sulfide from a mixed sulfide concentrate, the mixed sulfide concentrate having at least one sulfide comprising antimony, arsenic, and at least two metals, the at least two metals comprising a first metal and a second metal, the process comprising: subjecting the mixed sulfide concentrate to flotation using one or more of a sulfite salt and a caustic starch solution in which at least one sulfide comprising antimony, arsenic, and the first metal is floated and at least one sulfide comprising the second metal is depressed, the flotation yielding a first metal concentrate and a second metal concentrate, the first metal concentrate having the at least one sulfide comprising antimony, arsenic, and the first metal, and the second metal concentrate having the at least one sulfide comprising the second metal.

Antimony and arsenic may be present in the mixed sulfide concentrate in a molar ratio of about 0.5:1 to about 1.5:1. Antimony and arsenic may be present in the mixed sulfide concentrate in a molar ratio of about 1:1.

The mixed sulfide concentrate may comprise the at least two metals, and a major amount of arsenic relative to antimony. The mixed sulfide concentrate may comprise the at least two metals, and a major amount of antimony relative to arsenic. The first metal and the second metal may be different metals. The first metal and the second metal may be the same metal. The first metal and the second metal may be selected from the group consisting of copper, lead, silver, iron, mercury, zinc, and vanadium. The first metal may be copper and the second metal may be lead.

The subjecting the mixed sulfide concentrate to flotation further comprises using at least one of a frother and a collector.

The second metal concentrate may have at least about 50% of the original antimony, arsenic, and the first metal content of the mixed sulfide concentrate removed. The second metal concentrate may have about 60% to about 90% of the original antimony, arsenic, and the first metal content of the mixed sulfide concentrate removed. The first metal concentrate may have at least about 50% of the original second metal content of the mixed sulfide concentrate removed. The first metal concentrate may have about 65% to about 98% of the original second metal content of the mixed sulfide concentrate removed. The further metal concentrate may have at least about 75% of the original antimony and arsenic content of the mixed sulfide concentrate removed. The further metal concentrate may have about 80% to about 95% of the original antimony and arsenic content of the mixed sulfide concentrate removed.

The process may further comprise leaching the first metal concentrate to yield a further metal concentrate and a leach solution, the further metal concentrate comprising the first metal and the leach solution comprising soluble arsenic and soluble antimony. The process may further comprise washing solids remaining after the leaching with to yield a first wash solution. The process may further comprise: acidifying the first wash solution to form a precipitate and yield a first wash slurry; and separating the precipitate from the first wash slurry to yield a second wash solution. The process may further comprise: acidifying the second wash solution to precipitate arsenic and antimony species as a slurry; separating the precipitated arsenic and antimony species; and leaching the precipitated arsenic and antimony species with the first metal concentrate during the leaching. The process may further comprise prior to the acidifying, oxidizing the first wash solution so as to oxidize $As^{3+}$ to $As^{5+}$ and $Sb^{3+}$ to $Sb^{5+}$. The process may further comprise: leaching the precipitate with the first metal concentrate during the leaching.

The sulfides may comprise antimony, arsenic and at least two metals comprise sulfosalts. The sulfosalts may comprise at least one of sulfarsenites, sulfarsenates, sulfantimonites, sulfantimonates and sulfosalts of SnS archetype. The sulfosalts may comprise at least one of tetrahedrite, tennantite, enargite, bournonite, famatinite, and jamesonite.

The second metal concentrate may be substantially free of antimony, arsenic and the first metal. The further metal concentrate may be substantially free of antimony and arsenic.

In another aspect, there is provides a process for leaching a first metal concentrate having at least one sulfide comprising antimony, arsenic, and at least one metal, the process comprising: leaching the first metal concentrate to yield a further metal concentrate and a leach solution, the leach solution comprising soluble arsenic and soluble antimony; removing the soluble antimony and soluble arsenic from the leach solution by crystallization; and recovering the leach solution for recycling.

Antimony and arsenic may be present in the at least one sulfide comprising antimony, arsenic and the at least one metal in a molar ratio of about 0.5:1 to about 1.5:1. Antimony and arsenic may be present in the at least one sulfide comprising antimony, arsenic and the at least one metal in a molar ratio of about 1:1. The mixed sulfide concentrate may comprise the at least one metal, and a major amount of arsenic relative to antimony. The mixed sulfide concentrate may comprise the at least one metal, and a major amount of antimony relative to arsenic.

The at least one sulfide may comprise at least two sulfides comprising different metals. The at least one sulfide may comprise at least two sulfides comprising the same metal.

The at least one metal may be selected from the group consisting of copper, lead, silver, iron, mercury, zinc, and vanadium. The at least one metal may comprise copper. The process may further comprise, prior to the removing: oxidizing the soluble arsenic and antimony in the leach solution to yield soluble antimony and arsenic thiosalts. The oxidizing the soluble antimony and arsenic in the leach solution may comprise oxidizing with elemental sulfur. The process may further comprise determining an oxidation end point by at least one of wavelength monitoring and oxidation reduction potential (ORP) monitoring. The process may further comprise removing the soluble antimony and arsenic thiosalts from the leach solution by crystallization.

The removing may comprise cooling the leach solution to induce the crystallization. The crystallization may comprise forming thioarsenate and thioantimonate salts.

The process may further comprise dissolving crystals formed by the crystallization to yield soluble antimony and arsenic thiosalts. The further metal concentrate may be washed to yield an wash solution, the dissolving comprising dissolving the crystals in the wash solution.

The process may further comprise oxidizing the soluble antimony and arsenic thiosalts to yield an antimony precipitate and an arsenic solution. The oxidizing the soluble antimony and arsenic thiosalts may comprise using an oxidizing agent. The oxidizing agent may be hydrogen peroxide and/or a metal catalyzed hydroquinone. The oxidizing the soluble antimony and arsenic thiosalts may be carried out at about atmospheric pressure. The process may further comprise: prior to the oxidizing the soluble antimony and arsenic thiosalts, acidifying a solution comprising the soluble antimony and arsenic thiosalts to precipitate arsenic and antimony species as a slurry; and dissolving the precipitated arsenic and antimony species through addition of base to the slurry, wherein the oxidizing comprises oxidizing the dissolved arsenic and antimony species. The process may further comprise: prior to the oxidizing the soluble antimony and arsenic thiosalts, acidifying a solution comprising the soluble antimony and arsenic thiosalts to precipitate an additional antimony sulfide product as a slurry; separating the additional antimony sulfide product from the slurry; acidifying the slurry to precipitate arsenic and antimony species; and dissolving the precipitated arsenic and antimony species through addition of base to the slurry, wherein the oxidizing comprises oxidizing the dissolved arsenic and antimony species. The additional antimony sulfide product may comprise antimony pentasulfide. Hydrogen sulfide gas may be produced, and the hydrogen sulfide gas may be passed through a caustic scrubber. A sodium sulfide product or a sodium hydrosulfide product may be formed. The process may further comprise combining the sodium sulfide product or the sodium hydrosulfide product with leach reagents during the leaching. The antimony precipitate may comprise sodium antimony hydroxide.

The arsenic solution may comprise soluble arsenate. The process may further comprise forming a stable arsenic compound from the arsenic solution. The forming further comprises returning a portion of the stable arsenic compound to the forming to act as precipitation seed material during the forming. The process may further comprise, prior to the forming: acidifying the arsenic solution to decompose thiosulfates, to yield an acidified solution; oxidizing the acidified solution to oxidize residual $As^{3+}$ to $As^{5+}$ and reduced sulfur species to sulfates, to yield a slurry comprising elemental sulfur; separating elemental sulfur from the slurry to yield a liquid; and oxidizing the liquid to oxidize residual reduced sulfur species, to yield an oxidized solution, wherein the forming comprises forming the stable arsenic compound from the oxidized solution. The process may further comprise using the elemental sulfur for use as an oxidizing agent for the oxidizing of the leach solution. The process may further comprise, prior to the forming: oxidizing the arsenic solution to oxidize residual $As^{3+}$ to $As^{5+}$ and reduced sulfur species to sulfates, to yield an oxidized solution; and acidifying the oxidized solution to yield an acidified oxidized solution, wherein forming comprises forming the stable arsenic compound from the acidified oxidized solution. The stable arsenic compound may comprise ferric arsenate. The stable arsenic compound may be compliant with toxic characteristic leaching procedure (TCLP) standards.

The at least one sulfide comprising antimony, arsenic and the at least one metal may comprise one or more sulfosalts. The one or more sulfosalts may comprise at least one of sulfarsenites, sulfarsenates, sulfantimonites, sulfantimonates and sulfosalts of SnS archetype. The one or more sulfosalts may comprise at least one of tetrahedrite, tennantite, enargite, bournonite, famatinite, and jamesonite.

The further metal concentrate may be substantially free of antimony and arsenic.

In another aspect, there is provided a process for separation of antimony and arsenic from a leach solution comprising soluble antimony and arsenic, the process comprising: oxidizing the soluble antimony and arsenic in the leach solution so as to reach an oxidation end point determined by at least one of wavelength monitoring and oxidation reduction potential (ORP) monitoring, to yield soluble antimony and arsenic thiosalts; and oxidizing the soluble antimony and arsenic thiosalts to yield an antimony precipitate and an arsenic solution.

Antimony and arsenic may be in the leach solution in a molar ratio of about 0.5:1 to about 1.5:1. Antimony and arsenic may be present in the leach solution in a molar ratio of about 1:1. The leach solution may comprise a major amount of arsenic relative to antimony. The leach solution may comprise a major amount of antimony relative to arsenic.

The oxidizing the soluble antimony and arsenic in the leach solution may comprise oxidizing with elemental sulfur.

The process may further comprise removing the soluble antimony and arsenic thiosalts from the leach solution by crystallization. The process may further comprise recovering the leach solution for recycling. The removing may comprise cooling the leach solution to induce the crystallization. The cooling may be controlled to avoid crystallization of alkali metal sulfide. The crystallization may comprise forming thioarsenate and thioantimonate salts. The process may further comprise dissolving crystals formed by the crystallization to yield the soluble antimony and arsenic thiosalts.

The oxidizing the soluble antimony and arsenic thiosalts may comprise using an oxidizing agent. The oxidizing agent may be hydrogen peroxide and/or a metal catalyzed hydroquinone.

The oxidizing the soluble antimony and arsenic thiosalts may be carried out at about atmospheric pressure.

The process may further comprise: prior to the oxidizing the soluble antimony and arsenic thiosalts, acidifying a solution comprising the soluble antimony and arsenic thiosalts to precipitate arsenic and antimony species as a slurry; and dissolving the precipitated arsenic and antimony species through addition of base to the slurry, wherein the oxidizing comprises oxidizing the dissolved arsenic and antimony species.

The process may further comprise: prior to the oxidizing the soluble antimony and arsenic thiosalts, acidifying a solution comprising the soluble antimony and arsenic thiosalts to precipitate an additional antimony sulfide product as a slurry; separating the additional antimony sulfide product from the slurry; acidifying the slurry to precipitate arsenic and antimony species; and dissolving the precipitated arsenic and antimony species through addition of base to the slurry, wherein the oxidizing comprises oxidizing the dissolved arsenic and antimony species. The additional antimony sulfide product comprises antimony pentasulfide. Hydrogen sulfide gas may be produced and the hydrogen sulfide gas may be passed through a caustic scrubber. A sodium sulfide product or a sodium hydrosulfide product may be formed.

The antimony precipitate may comprise sodium antimony hydroxide.

The arsenic solution may comprise soluble arsenate.

The process may further comprise forming a stable arsenic compound from the arsenic solution. The forming further comprises returning a portion of the stable arsenic compound to the forming to act as precipitation seed material during the forming. The process may further comprise, prior to the forming: acidifying the arsenic solution to decompose thiosulfates, to yield an acidified solution; oxidizing the acidified solution to oxidize residual $As^{3+}$ to $As^{5+}$ and reduced sulfur species to sulfates, to yield a slurry comprising elemental sulfur; separating elemental sulfur from the slurry to yield a liquid; and oxidizing the liquid to oxidize residual reduced sulfur species, to yield an oxidized solution, wherein the forming comprises forming the stable arsenic compound from the oxidized solution. The process may further comprise using the elemental sulfur for use as an oxidizing agent for the oxidizing of the leach solution. The process may further comprise, prior to the forming: oxidizing the arsenic solution to oxidize residual $As^{3+}$ to $As^{5+}$ and reduced sulfur species to sulfates, to yield an oxidized solution; and acidifying the oxidized solution to yield an acidified oxidized solution, wherein forming comprises forming the stable arsenic compound from the acidified oxidized solution. The stable arsenic compound may comprise ferric arsenate. The stable arsenic compound may be compliant with toxic characteristic leaching procedure (TCLP) standards.

In another aspect, there is provided a stabilization process for an arsenic solution derived from a mixed sulfide concentrate, the mixed sulfide concentrate having at least one sulfide comprising antimony, arsenic and at least one metal, the process comprising: forming a stable arsenic compound from the arsenic solution, at about atmospheric pressure.

Antimony and arsenic may be present in the mixed sulfide concentrate in a molar ratio of about 0.5:1 to about 1.5:1. Antimony and arsenic may be present in the mixed sulfide concentrate in a molar ratio of about 1:1.

The mixed sulfide concentrate may comprise the at least one metal, and a major amount of arsenic relative to antimony. The mixed sulfide concentrate may comprise the at least one metal, and a major amount of antimony relative to arsenic.

The arsenic solution may have an As:Sb concentration (g/L) ratio of about 10:1 to about 500:1, typically about 20:1 to about 200:1, and more typically about 50:1 to about 100:1.

The at least one metal may be selected from the group consisting of copper, lead, silver, iron, mercury, zinc, and vanadium. The at least one metal may comprise copper.

The arsenic solution may comprise soluble arsenate.

The process may further comprise forming a stable arsenic compound from the arsenic solution for disposal. The forming further comprises returning a portion of the stable arsenic compound to the forming to act as precipitation seed material during the forming. The process may further comprise, prior to the forming: acidifying the arsenic solution to decompose thiosulfates, to yield an acidified solution; oxidizing the acidified solution to oxidize residual $As^{3+}$ to $As^{5+}$ and reduced sulfur species to sulfates, to yield a slurry comprising elemental sulfur; separating elemental sulfur from the slurry to yield a liquid; and oxidizing the liquid to oxidize residual reduced sulfur species, to yield an oxidized solution, wherein the forming comprises forming the stable arsenic compound from the oxidized solution. The process may further comprise using the elemental sulfur for use as an oxidizing agent for the oxidizing of the leach solution. The process may further comprise, prior to the forming: oxidizing the arsenic solution to oxidize residual $As^{3+}$ to $As^{5+}$ and reduced sulfur species to sulfates, to yield an oxidized solution; and acidifying the oxidized solution to yield an acidified oxidized solution, wherein forming comprises forming the stable arsenic compound from the acidified oxidized solution. The stable arsenic compound may comprise ferric arsenate. The stable arsenic compound may be compliant with toxic characteristic leaching procedure (TCLP) standards.

In another aspect, there is provided a stabilization process for an arsenic solution comprising thiosulfates, the process comprising: acidifying the arsenic solution to decompose the thiosulfates, to yield an acidified solution; oxidizing the acidified solution to oxidize residual $As^{3+}$ to $As^{5+}$ and reduced sulfur species to sulfates, to yield a slurry comprising elemental sulfur; separating elemental sulfur from the slurry to yield a liquid; oxidizing the liquid to oxidize residual reduced sulfur species, to yield an oxidized solution; and forming a stable arsenic compound from the oxidized solution.

The process may further comprise forming a stable arsenic compound from the oxidized solution, at about atmospheric pressure. The stable arsenic compound may comprise ferric arsenate. The stable arsenic compound may be compliant with toxic characteristic leaching procedure (TCLP) standards.

The arsenic solution may be derived from a mixed sulfide concentrate, the mixed sulfide concentrate having at least one sulfide comprising antimony, arsenic and at least one metal. Antimony and arsenic may be present in the mixed sulfide concentrate in a molar ratio of about 0.5:1 to about 1.5:1. Antimony and arsenic may be present in the mixed sulfide concentrate in a molar ratio of about 1:1. The mixed sulfide concentrate may comprise the at least one metal, and a major amount of arsenic relative to antimony. The mixed sulfide concentrate may comprise the at least one metal, and a major amount of antimony relative to arsenic. The at least one metal may be selected from the group consisting of copper, lead, silver, iron, mercury, zinc, and vanadium.

In still another aspect, there is provided a stabilization process for an arsenic solution, the process comprising: oxidizing the arsenic solution to oxidize $As^{3+}$ to $As^{5+}$ and reduced sulfur species to sulfates, to yield an oxidized solution; and acidifying the oxidized solution to yield an acidified oxidized solution; and forming a stable arsenic compound from the acidified oxidized solution.

The process may further comprise forming the stable arsenic compound from the oxidized solution at about atmospheric pressure. The stable arsenic compound may comprise ferric arsenate. The stable arsenic compound may be compliant with toxic characteristic leaching procedure (TCLP) standards.

The arsenic solution may be derived from a mixed sulfide concentrate, the mixed sulfide concentrate having at least one sulfide comprising antimony, arsenic and at least one metal. Antimony and arsenic may be present in the mixed sulfide concentrate in a molar ratio of about 0.5:1 to about 1.5:1. Antimony and arsenic may be present in the mixed sulfide concentrate in a molar ratio of about 1:1. The mixed sulfide concentrate may comprise the at least one metal, and a major amount of arsenic relative to antimony. The mixed sulfide concentrate may comprise the at least one metal, and a major amount of antimony relative to arsenic. The at least one metal may be selected from the group consisting of copper, lead, silver, iron, mercury, zinc, and vanadium.

In accordance with the above aspects, the sodium concentration of the oxidized solution may be at least about 10 g/L. The sodium concentration of the oxidized solution may be about 30 g/L to about 70 g/L. The sodium concentration of the oxidized solution may be about 50 g/L to about 60 g/L.

In accordance with the above aspects, the process may further comprise extracting at least one precious metal. The extracting may comprise utilizing at least one of an ion exchange resin and a precipitation process. The precious metal may be gold.

In accordance with the above aspects, the wavelength monitoring may be colorimetry.

BRIEF DESCRIPTION OF THE DRAWINGS

Embodiments will now be described more fully with reference to the accompanying drawings in which.

DETAILED DESCRIPTION OF THE DISCLOSURE

Figure 1:
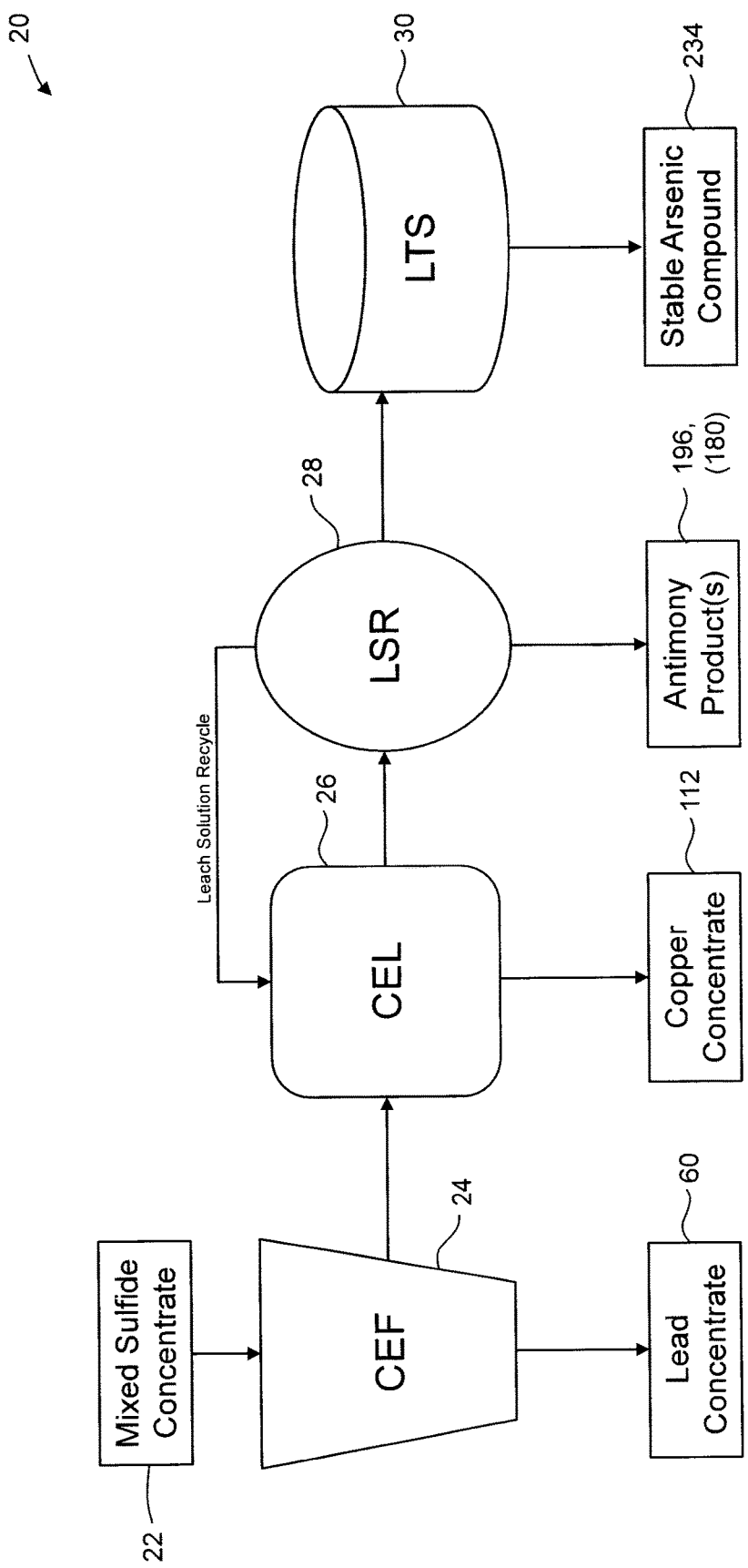
FIG. 1 is a flowchart showing an embodiment of a process for separation of metal sulfides from a mixed sulfide concentrate.

In embodiments, a process is provided for separation of at least one metal sulfide from a mixed sulfide ore or concentrate.

The mixed sulfide concentrate comprises at least one sulfide having at least one metal and/or at least one semi-metal. It is understood, when used herein, that at least one sulfide having at least one metal and/or at least one semi-metal may be selected from, for example, any sulfur-bearing compound of one or more metals; any sulfur-bearing compound of one or more semi-metals; any sulfur-bearing compound of one or more metals and one or more semi-metals, such as, and without being limited thereto, sulfosalts; and mixtures thereof. The one or more metals may be selected from, for example, copper, lead, silver, iron, mercury, zinc, or vanadium. The one or more semi-metals may be selected from, for example, arsenic, antimony, bismuth or germanium. As will be understood, sulfosalts comprise one or more metals, one or more semi-metals, and sulfur. Sulfosalts containing arsenic include sulfarsenites, such as tennantite, and sulfarsenates, such as enargite. Sulfosalts containing antimony include sulfantimonites, such as tetrahedrite and bournonite, sulfantimonates, such as famatinite, and sulfosalts of SnS archetype, such as jamesonite. It is known to be difficult to recover certain metals from such minerals. It is desirable to be able to recover, for example, metals, such as copper, from concentrates containing metal arsenic sulfosalt minerals and metal antimony sulfosalt minerals using an economically viable, hydrometallurgical process, while converting deleterious elements into one or more environmentally stable products.

In another embodiment, there is provided a process for separation of at least one metal sulfide from a mixed sulfide concentrate, where the mixed sulfide concentrate has at least one sulfide comprising antimony, arsenic and at least two metals, and the at least two metals comprise a first metal and a second metal. The process comprises: subjecting the mixed sulfide concentrate to flotation in which at least one sulfide comprising antimony, arsenic and the first metal is floated and at least one sulfide comprising the second metal is depressed, the flotation yielding a first metal concentrate and a second metal concentrate, the first metal concentrate having the at least one sulfide comprising antimony, arsenic and the first metal, and the second metal concentrate having the at least one sulfide comprising the second metal; leaching the first metal concentrate to yield a further metal concentrate and a leach solution, the further metal concentrate comprising the first metal and the leach solution comprising soluble antimony and soluble arsenic; and one of: (i) oxidizing the leach solution to yield an antimony precipitate and an arsenic solution; (ii) forming a stable arsenic compound from the leach solution; and (iii) oxidizing the leach solution to yield an antimony precipitate and an arsenic solution, and forming a stable arsenic compound from the arsenic solution.

In an embodiment of the process, the mixed sulfide concentrate is subjected to flotation in which copper, antimony, and arsenic sulfides are floated and lead sulfide is depressed. The flotation yields a lead concentrate comprising the lead sulfide and a first copper concentrate comprising the copper, antimony, and arsenic sulfides. The first copper concentrate is then leached to yield a second copper concentrate comprising the copper sulfide, and a leach solution comprising soluble arsenic and antimony. The leach solution is oxidized to yield an antimony precipitate and an arsenic solution. In other embodiments, a stable arsenic compound is formed from the arsenic solution for disposal. In additional embodiments, the lead concentrate is, substantially free of the copper, arsenic and antimony sulfides and/or the second copper concentrate is substantially free of the arsenic and antimony.

In still other embodiments, a specific flotation process is provided. A mixed sulfide concentrate comprising lead, copper, antimony and arsenic sulfide is subjected to flotation. The process comprises subjecting the mixed sulfide concentrate to flotation using one or more of a sulfite salt and a caustic starch solution in which lead sulfide (e.g. galena) is depressed in comparison to the copper, antimony and arsenic sulfides. The flotation provides a lead concentrate separate from a first copper concentrate. The lead concentrate comprises the lead sulfide and the first copper concentrate comprises the copper, arsenic and antimony sulfides (e.g. copper sulfosalts). In additional embodiments, the lead concentrate is substantially free of the copper, arsenic and antimony sulfides.

In another embodiment, there is provided a process for separation of at least one metal sulfide from a mixed sulfide concentrate, the mixed sulfide concentrate having at least one sulfide comprising antimony, arsenic, and at least two metals, the at least two metals comprising a first metal and a second metal. The process comprises: subjecting the mixed sulfide concentrate to flotation using one or more of a sulfite salt and a caustic starch solution in which at least one sulfide comprising antimony, arsenic, and the first metal is floated and at least one sulfide comprising the second metal is depressed, the flotation yielding a first metal concentrate and a second metal concentrate, the first metal concentrate having the at least one sulfide comprising antimony, arsenic, and the first metal, and the second metal concentrate having the at least one sulfide comprising the second metal.

In still other embodiments, a process for leaching a first copper concentrate comprising copper, antimony and arsenic sulfides (e.g. copper sulfosalts) is provided. The first copper concentrate is leached in an alkaline environment to yield a second copper concentrate, and a first leach solution comprising soluble arsenic and antimony. The soluble antimony and arsenic are removed from the leach solution by crystallization. The leach solution is recovered for recycling. In other embodiments, the second copper concentrate is substantially free of the arsenic and antimony sulfides.

In another embodiment, there is provided a process for leaching a first metal concentrate having at least one sulfide comprising antimony, arsenic, and at least one metal. The process comprises: leaching the first metal concentrate to yield a further metal concentrate and a leach solution, the further metal concentrate comprising the first metal and the leach solution comprising soluble arsenic and soluble antimony; removing the soluble antimony and soluble arsenic from the leach solution by crystallization; and recovering the leach solution for recycling.

In still other embodiments, a process for separation of antimony and arsenic from a leach solution comprising soluble antimony and arsenic is provided. The soluble antimony and arsenic in the leach solution are oxidized to reach an oxidation endpoint determined by at least one of wavelength monitoring and oxidation reduction potential (ORP) monitoring, to yield soluble antimony and arsenic thiosalts. The soluble antimony and arsenic thiosalts are oxidized to yield an antimony precipitate and an arsenic solution.

In another embodiment, there is provided a process for separation of antimony and arsenic from a leach solution comprising soluble antimony and arsenic, the process comprising: oxidizing the soluble antimony and arsenic in the leach solution so as to reach an oxidation end point determined by at least one of wavelength monitoring and oxidation reduction potential (ORP) monitoring, to yield soluble antimony and arsenic thiosalts; and oxidizing the soluble antimony and arsenic thiosalts to yield an antimony precipitate and an arsenic solution.

In further embodiments, a stabilization process for an arsenic solution derived from a mixed sulfide concentrate is provided, where the mixed sulfide concentrate comprises lead, copper, antimony and arsenic sulfides. The process comprises forming a stable arsenic compound from the arsenic solution, at about atmospheric pressure (e.g. about standard atmospheric pressure), optionally, for disposal. Therefore, the stabilization process does not take place in an autoclave.

In another embodiment, there is provided a stabilization process for an arsenic solution derived from a mixed sulfide concentrate, the mixed sulfide concentrate having at least one sulfide comprising antimony, arsenic and at least one metal. The process comprises: forming a stable arsenic compound from the arsenic solution, at about atmospheric pressure.

In another embodiment, there is provided a stabilization process for an arsenic solution comprising thiosulfates. The process comprises: acidifying the arsenic solution to decompose the thiosulfates, to yield an acidified solution; oxidizing the acidified solution to oxidize residual $As^{3+}$ to $As^{5+}$ and reduced sulfur species to sulfates, to yield a slurry comprising elemental sulfur; separating elemental sulfur from the slurry to yield a liquid; oxidizing the liquid to oxidize residual reduced sulfur species, to yield an oxidized solution; and forming a stable arsenic compound from the oxidized solution.

In another embodiment, there is provided a stabilization process for an arsenic solution. The process comprises: oxidizing the arsenic solution to oxidize $As^{3+}$ to $As^{5+}$ and reduced sulfur species to sulfates, to yield an oxidized solution; and acidifying the oxidized solution to yield an acidified oxidized solution; and forming a stable arsenic compound from the acidified oxidized solution.

It is understood that, when used herein, that an autoclave is a pressurized vessel used for chemical reactions and other processes.

Turning now to FIG. 1, an embodiment for a process for separation of metal sulfides from a mixed-sulfide concentrate comprising sulfosalts is shown, and is generally indicated by reference numeral 20.

Process 20 comprises a plurality of sub-processes that are carried out generally in sequence to process a mixed-sulfide concentrate 22 for separating and recovering metal sulfides therefrom. The mixed-sulfide concentrate 22 is formed from ore using one or more processes known to those skilled in the art, and comprises lead, copper, antimony and arsenic sulfides, as well as other minerals and precious metals. More specifically, the mixed-sulfide concentrate 22 is lead-rich and predominantly comprises galena (PbS) and copper sulfosalts, with antimony and arsenic being present in the mixed-sulfide concentrate 22 in any molar ratio. Typically, the antimony and arsenic are present in the mixed-sulfide concentrate 22 in a molar ratio of about 0.5:1 to about 1.5:1, and more typically in a molar ratio of about 1:1. In the embodiment shown, the sub-processes include a concentrate enrichment flotation process 24, a concentrate enrichment leaching process 26, a leach solution recovery process 28, and a leach tails stabilization process 30.

Certain embodiments of the sub-processes are outlined below with respect to FIGS. 2 to 13.

Figure 2:
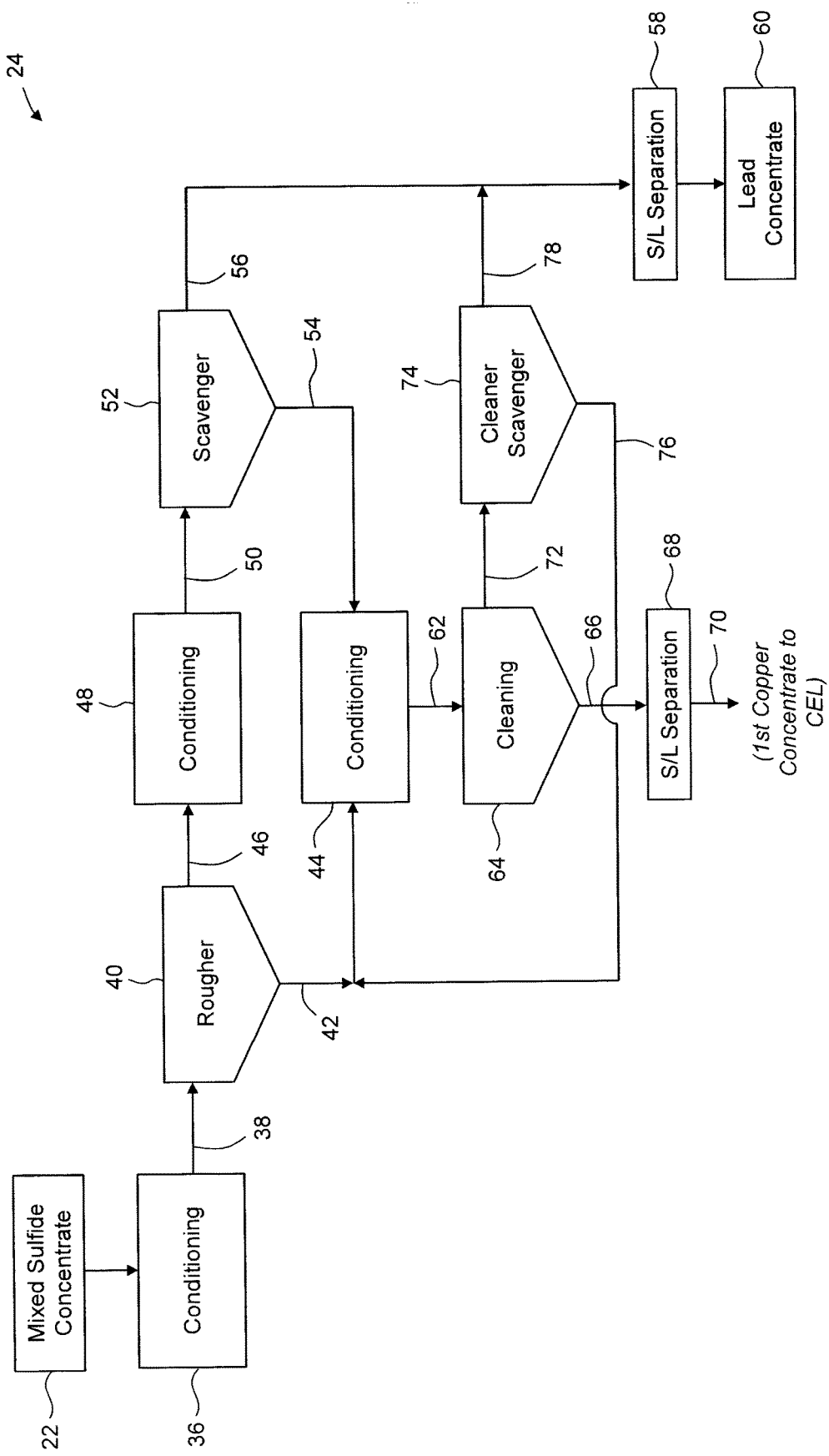
FIG. 2 is a flowchart showing an embodiment of a concentrate enrichment flotation process forming part of the process for separation of metal sulfides from a mixed sulfide concentrate of FIG. 1.

FIG. 2 shows steps of the concentrate enrichment flotation process 24. In the process 24, copper and lead are generally separated by a series of flotation steps in which copper minerals are floated and lead sulfide is depressed. Process 24 begins with the mixed-sulfide concentrate 22 being delivered to a primary conditioner 36, where conditioning reagents, described below, are added to the concentrate to form a primary conditioner pulp 38 having a solids content of about 8% by weight to about 15% by weight, and having a pH of about 5.5 to about 7.0. The primary conditioner pulp 38 is then transferred to a rougher 40 where it undergoes flotation. The rougher 40 yields a lead-deficient rougher concentrate 42, which is collected and transferred to a cleaning conditioner 44. The rougher 40 also yields lead-rich rougher tailings 46, which are transferred to a scavenger conditioner 48 where conditioning reagents are combined therewith to form a rougher tailings pulp 50. The rougher tailings pulp 50 is then fed to a rougher scavenger 52, where it undergoes further flotation. The rougher scavenger 52 yields a lead-deficient scavenger concentrate 54, which is collected and transferred to the cleaning conditioner 44. The rougher scavenger 52 also yields lead-rich scavenger tailings 56, which are subjected to solid-liquid separation 58 to remove liquid so as to yield a solid, clean lead concentrate. In this embodiment, the clean lead concentrate 60 predominantly contains galena (PbS). The lead concentrate 60 is substantially free of copper, antimony and arsenic sulfides. Typically, at least about 50% of the original copper, antimony and arsenic sulfide content of the mixed sulfide concentrate 22 has been removed; more typically, about 50% to about 95%, about 60% to about 90%, or about 65% to about 85% has been removed.

In the cleaning conditioner 44, conditioning reagents are combined with the lead-deficient concentrates 42, 54 and 76 to form a secondary conditioner pulp 62 having a solids content of about 10% to about 20%, and having a pH of about 5.5 to about 7.5. The secondary conditioner pulp 62 is subjected to a cleaning process 64, where it undergoes further flotation. The cleaning process 64 may comprise a single cleaning flotation bank, or may comprise two or more cleaning flotation banks (not shown) connected in series, such that concentrate from each upstream bank is collected and transferred to the next bank downstream in the series, and tailings from each downstream bank are fed to the previous bank upstream in the series. As is known in the art, each flotation bank includes one or more flotation cells connected in series. Concentrate 66 from the cleaning process 64 is collected and subjected to solid-liquid separation 68 so as to yield a solid, first copper concentrate 70 (e.g. a "dirty" copper concentrate). The first copper concentrate 70 is substantially free of lead sulfide(s). Typically, at least about 50% of the original lead sulfide content of the mixed sulfide concentrate 22 has been removed, more typically, about 65% to about 98%; about 75% to about 96%, or about 85% to about 95% has been removed.

Tailings 72 from the cleaning process 64 are fed to a cleaner scavenger 74 where they undergo further flotation. The cleaner scavenger 74 yields a lead-deficient cleaner scavenger concentrate 76, which is collected and transferred to the cleaning conditioner 44 with the lead-deficient concentrates 42 and 54. The cleaner scavenger 74 also yields lead-rich rougher tailings 78, which are subjected to the solid-liquid separation 58 to remove liquid so as to yield the solid, clean lead concentrate 60.

The conditioning reagents used for the concentrate enrichment flotation process 24 comprise a collector, a frother, a depressant, and a dispersant. In this embodiment, the collector is a thionocarbamate, which is a poor collector for galena and is therefore suitable for selective flotation of copper sulfosalts in copper-lead concentrates. In this embodiment, the frother is methyl isobutyl carbinol, and the depressant is an ammonium bisulfite solution. The depressant is added to depress lead sulfide flotation, and the method of addition of the depressant is based on achieving a target pH in the pulp. In this embodiment, a caustic starch solution is used as the dispersant. The collector is added to the rougher and cleaning process 64, and may also be added to the scavenger conditioner 48 and the cleaner scavenger 74. The frother is added to the scavenger 52 and the cleaning process 64, and may also be added to the rougher. The depressant and the dispersant are added to the first conditioner 36, the cleaning conditioner 44, and to the cleaning process 64. The dispersant may also be added to the scavenger conditioner 48 and to the cleaner scavenger 74.

Figure 3:
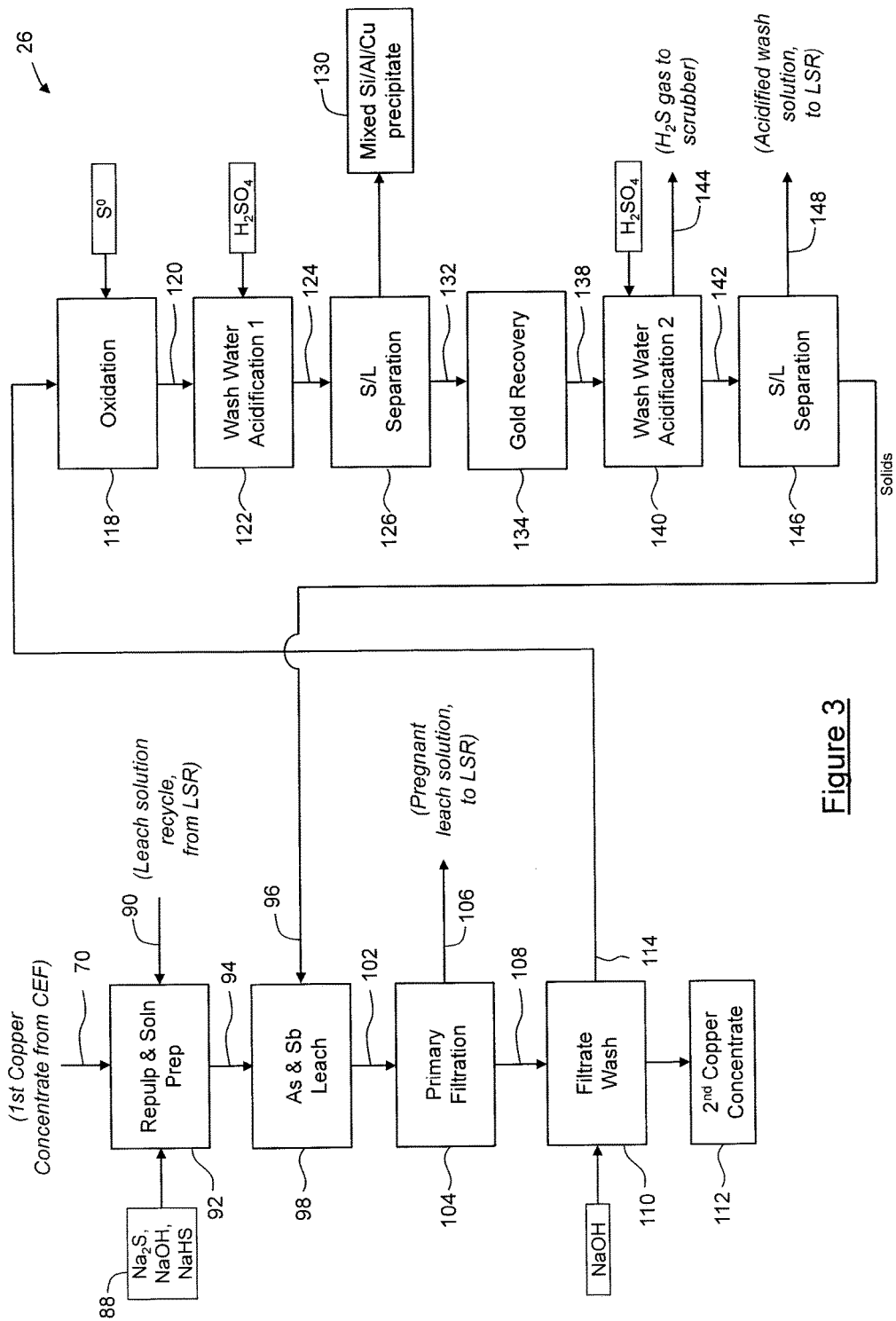
FIG. 3 is a flowchart showing an embodiment of a concentrate enrichment leach process forming part of the process for separation of metal sulfides from a mixed sulfide concentrate of FIG. 1.

FIG. 3 shows steps of the concentrate enrichment leaching process 26. In the process 26, the first copper concentrate 70 is combined with leach reagents 88 and recycled leach solution 90 from the leach solution recovery process 28, described below, in a repulp/solution preparation process 92 to form a leach feed pulp 94. In this embodiment, the leach reagents 88 are sodium sulfide ($Na_2S$) flake having complex from $.0H_2O$ to about $.9H_2O$, sodium hydroxide (NaOH), and sodium hydrosulfide (NaHS). In this embodiment, NaHS is obtained by passing hydrogen sulfide ($H_2S$) evolved downstream during a second acidification process 140 through a caustic scrubber, described below, however in other embodiments, NaHS may be alternatively sourced, such as being supplied as NaHS flake typically having complex of $.1H_2O$. If desired, NaHS can be reacted with NaOH to convert it to $Na_2S$ for inclusion in the leach reagents 88. In the embodiment shown, the leach feed pulp 94 is combined with solids 96 from a wash water acidification process, described below, to yield a leach slurry having a solids content of about 15% to about 30%, and typically about 20%, that is then subjected to a leaching process 98. During the leaching process 98, antimony and arsenic are leached in a high pH environment at about atmospheric pressure. The leaching process 98 is carried out at a temperature of about 95° C. to about 105° C. using a $S^{2-}$ concentration of about 100 to about 120 g/L, and for a time sufficient to achieve greater than about 90% arsenic and antimony extraction, typically about four (4) to about eight (8) hours. The leaching process 98 yields a leach pulp 102 that is subjected to a filtration process 104, in which solids are removed to yield a leach solution 106. In this embodiment, the filtration process 104 is performed using a suitable filtration device, such as a recessed plate filter press. Solids 108 filtered by the filtration process 104 are subjected to a sodium hydroxide (NaOH) filtrate wash process 110 to provide protective alkalinity and/or to prevent arsenic and antimony precipitation, so as to yield a solid, second copper concentrate 112 (e.g. a "clean" copper concentrate). The second copper concentrate 112 is substantially free of antimony and arsenic sulfides and is of suitable grade for commercial sale. Typically, at least about 75% of the original antimony and arsenic sulfide content of the mixed sulfide concentrate 22 has been removed; more typically, about 75% to about 99% has been removed; still more typically; about 80% to about 95% has been removed, and most typically about 85% to about 95% has been removed.

In this embodiment, the wash solution 114 from the filtrate wash process 110 is then subjected to an oxidation process 118, in which elemental sulfu) ($S^o$) is added to the wash solution 114 at an elevated temperature in order to oxidize ($As^{3+}$) and ($Sb^{3+}$) to ($As^{5+}$) and ($Sb^{5+}$), respectively, so as to yield an oxidized wash solution 120. The oxidation process 118 is carried out under about atmospheric pressure at a temperature of about 65° C. to about 75° C., as required for dissolution of elemental sulfur, and for a time of about 0.1 hours to about 1 hour. The oxidized wash solution 120 is then acidified in a first acidification process 122, in which silicon, aluminum and copper are precipitated to yield an acidified wash slurry 124. In this embodiment, during the first acidification process 122, sulfuric acid is added to the oxidized wash solution 120 to reduce the pH to about 9.0 to about 10.0, in order to induce precipitation of the silicon, aluminum and copper. The acidified wash slurry 124 is then subjected to solid-liquid separation 126 to yield a mixed silicon, aluminum and copper precipitate 130 and a solution 132. The solution 132 is then subjected to a gold recovery process 134, during which the solution 132 is passed through a strong base ion exchange resin for extraction of gold and/or other precious metals. Solution 138, which remains after gold recovery process 134, is then acidified in a second acidification process 140, in which arsenic and antimony are precipitated as their respective sulfides, and any remaining gold copper, selenium, mercury and other impurities are also precipitated, and in which hydrogen sulfide ($H_2S$) gas 144 is evolved. In this embodiment, during the second acidification process 140, sulfuric acid is added to the solution 138 to reduce the pH to about 3.0 to about 4.0, in order to ensure precipitation of the arsenic and antimony sulfides. The $H_2S$ gas 144 evolved during the second acidification process 140 is passed through a caustic scrubber (not shown) to yield a sodium sulfide ($Na_2S$) or sodium hydrosulfide (NaHS) product, which in the embodiment shown, is combined with leach reagents 88 in the repulp/solution preparation process 92, for recycling. As will be appreciated, the recycling of reagents reduces the cost of supplying reagents, and/or the cost of destruction of used reagents. The second acidification process 140 yields a slurry 142, which is subjected to solid-liquid separation 146 to yield the solids 96 and an acidified wash solution 148. The acidified wash solution 148 is advanced to crystal dissolution 164 where the remaining acid is neutralized, and the solids 96 are combined with the leach feed pulp 94 during the leaching process 98 to releach the contained arsenic and antimony sulfides.

Figure 4:
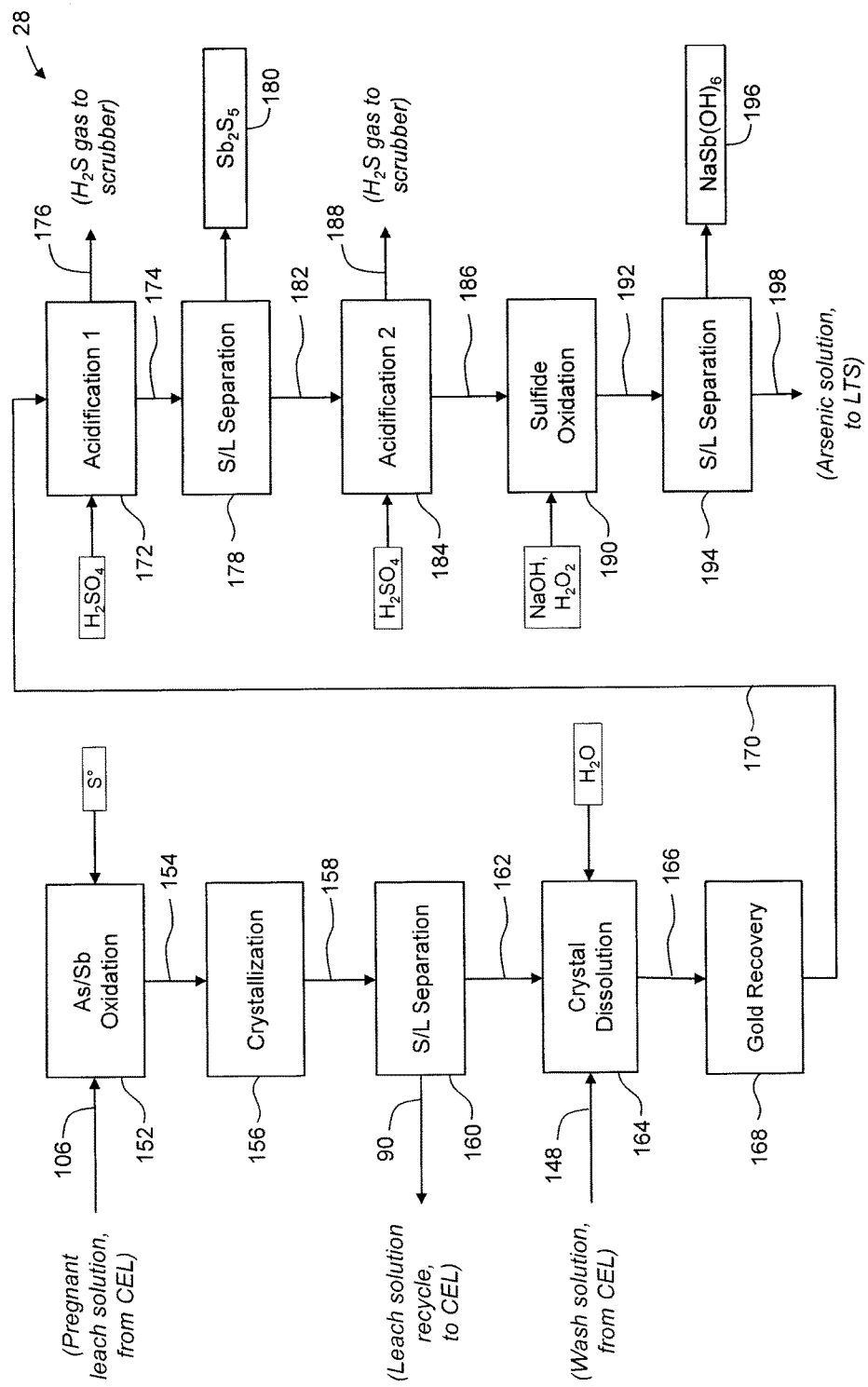
FIG. 4 is a flowchart showing an embodiment of a leach solution recovery process forming part of the process for separation of metal sulfides from a mixed sulfide concentrate of FIG. 1.

FIG. 4 shows steps of the leach solution recovery process 28. In the process 28, the leach solution 106, which is rich in both soluble arsenic and soluble antimony, is subjected to an oxidation process 152, in which elemental sulfur)(S° is added to the leach solution at an elevated temperature so as to yield an oxidized solution 154. During the oxidation process 152, the leach solution is monitored by colorimetry and/or oxidation reduction potential (ORP) to determine the endpoint of oxidation for controlling the addition of elemental sulfur. In this embodiment, the endpoint of oxidation occurs with a color change from yellow-green to orange-red. The oxidation process 152 is carried out under about atmospheric pressure at a temperature of about 65° C. to about 75° C., as required for dissolution of elemental sulfur, and for a time of about 0.1 hours to about 1 hour. The oxidized solution 154 is then subjected, in undiluted form, to a cooling process 156 to crystallize $Na_3(As,Sb)S_4 \cdot xH_2O$ solids, where x is typically from about 8 to about 9, so as to yield a slurry 158 comprising the $Na_3(As,Sb)S_4 \cdot xH_2O$ solids. In this embodiment, during the cooling process 156, the oxidized solution 154 is brought to a temperature of at least about 40° C., and typically about 40° C. to about 45° C., and is held at this temperature under suitable agitation so as to engender the growth of well-formed crystals, and for a time sufficient to allow crystallization to be complete, typically about one (1) hour to about three (3) hours. The slurry 158 is then subjected to solid-liquid separation 160 to separate the $Na_3(As,Sb)S_4 \cdot xH_2O$ solids 162 from the recycle leach solution 90. In this embodiment, the solid-liquid separation 160 is carried out using a centrifuge, or any filter that will provide suitable separation, and without washing so as to avoid crystal dissolution. The recycle leach solution 90 is combined with the leach reagents 88 in the repulp/solution preparation process 92 of the concentrate enrichment leaching process 26.

The solids 162 remaining after the solid-liquid separation 160 are dissolved in water and the acidified wash solution 148 (or wash solution 114, acidified wash solution 432, acidified wash solution 538, acidified wash solution 634 or acidified wash solution 750, from process 326, 426, 526, 626 or 727, respectively, described below) during a dissolution process 164 to yield a solution 166 comprising dissolved sodium thioantimonate ($Na_3SbS_4$) and dissolved sodium thioarsenate ($Na_3AsS_4$). The solution 166 has a combined antimony and arsenic concentration of about 50 g/L to about 100 g/L, depending on water addition. The solution 166 is then transferred to a gold recovery process 168 in which gold and/or other precious metals are recovered. In this embodiment, during the gold recovery process 168, the solution 166 is passed through a filter to recover insoluble gold from the dissolution process 164. Solution 170 remaining after the gold recovery process 168 is then acidified in a first acidification process 172, in which an antimony sulfide product containing predominantly antimony pentasulfide ($Sb_2S_5$) is precipitated to yield a slurry 174 and to evolve hydrogen sulfide ($H_2S$) gas 176. In this embodiment, during the first acidification process 172, sufficient sulfuric acid is added to the solution 170 to reduce the pH to about 13 to about 7, in order to induce precipitation of typically about 60% to about 80% of the contained antimony as antimony sulfide. After addition of the sulfuric acid, the slurry 174 is passed through a gas stripping tower (not shown), counter current to air, to remove any dissolved $H_2S$ gas. The $H_2S$ gas recovered from the solution is combined with the $H_2S$ gas 176 evolved during the first acidification process 172. The slurry 174 is then subjected to solid-liquid separation 178 to yield an antimony sulfide precipitate 180 and a solution 182. The solution 182 is then acidified in a second acidification process 184 to precipitate arsenic and antimony species, which may include generally all of the arsenic and antimony species, so as to yield an acidified slurry 186 and to evolve hydrogen sulfide ($H_2S$) gas 188. In this embodiment, during the second acidification process 184, sulfuric acid is added to the solution 182 to reduce the pH to about 4.0. The evolved $H_2S$ gas 188 (which may be combined with the $H_2S$ gas 176 above) is passed through a caustic scrubber (not shown) to yield a sodium sulfide ($Na_2S$) or sodium hydrosulfide (NaHS) product solution, which is combined with leach reagents 88 in the repulp/solution preparation process 92, for recycling. The acidified slurry 186 is passed through a gas stripping tower, counter current to air, to remove any dissolved $H_2S$ gas. The $H_2S$ gas recovered from the solution is combined with the $H_2S$ gas 188 evolved during the second acidification process 172. The acidified slurry 186 is then subjected to a sulfide oxidation process 190, in which the solution is made more basic through the addition of NaOH to dissolve the arsenic and antimony sulfide precipitate in slurry 186. Hydrogen peroxide ($H_2O_2$) is then added to oxidize the dissolved thiosalts. Any suitable oxidizing agent may be used. In this embodiment, sodium hydroxide having a concentration of typically 50 wt % is added until an endpoint pH of from about 10.0 to about 12.0 is reached, after which hydrogen peroxide having a concentration of 30% to 70% is added slowly over a time sufficient to oxidize the dissolved thiosalts completely or nearly completely, typically about 3 hours to about 6 hours. During the sulfide oxidation process 190, more sodium hydroxide is added to maintain the pH from about 10.0 to about 12.0 to prevent or reduce the formation of elemental sulfur. The sulfide oxidation process 190 is carried out at about atmospheric pressure, and advantageously does not require use of an autoclave. The sulfide oxidation process 190 yields a slurry 192 containing predominantly solid sodium antimony hydroxide ($NaSb(OH)_6$) and soluble arsenate ($AsO_4^{-3}$). The slurry 192 is then subjected to solid-liquid separation 194 to remove solids using any combination of thickeners, filters, or other commercially available solid-liquid separation technologies, so as to yield a solid sodium antimony hydroxide product 196 and a residual solution 198. The sodium antimony hydroxide product 196 may undergo further processing to produce an antimony-containing product of suitable grade for commercial sale.

Figure 5:
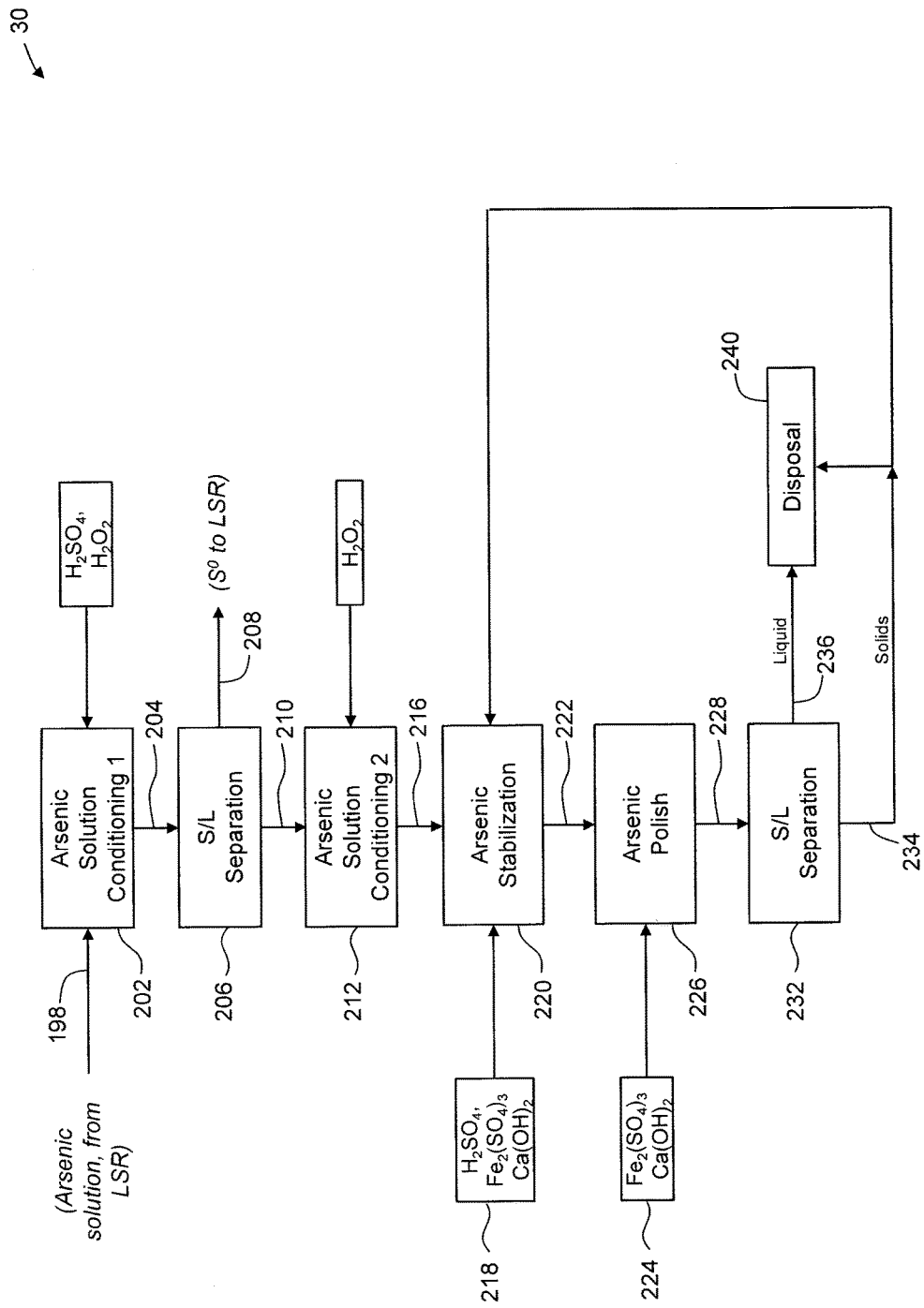
FIG. 5 is a flowchart showing an embodiment of a leach tails stabilization process forming part of the process for separation of metal sulfides from a mixed sulfide concentrate of FIG. 1.

FIG. 5 shows steps of the leach tails stabilization process 30. In the process 30, residual solution 198 from the solid-liquid separation 194 (or residual solution 898 or residual solution 998, from process 828 or 928, respectively, described below), which has an As:Sb concentration (g/L) ratio of about 10:1 to about 500:1, typically about 20:1 to about 200:1, and more typically about 50:1 to about 100:1, is subjected to a first arsenic solution conditioning process 202 to ensure complete oxidation of arsenic and the dissolved sulfur species. During the first arsenic solution conditioning process 202, the residual solution 198 is acidified through the addition of sulfuric acid so as to reduce the pH to about 1.5 to about 2.0 at a temperature of about 60° C. to about 80° C., in order to decompose thiosulfates, at least, and possibly other sulfur species. Hydrogen peroxide is then added to oxidize ($As^{3+}$) to ($As^{5+}$) and to oxidize soluble, reduced sulfur species to sulfate. The first arsenic solution conditioning process 202 yields a slurry 204 containing predominantly elemental sulfur, with soluble sulfate ($SO_4^{2-}$) and arsenate ($AsO_4^{3-}$). The slurry 204 is subjected to solid-liquid separation 206, so as to yield a mixed solid precipitate 208 comprising predominantly elemental sulfur, and a liquid 210. The elemental sulfur may be returned for use in the oxidation process 152. If necessary, the liquid 210 is then subjected to a second arsenic solution conditioning process 212, in which it is oxidized through the addition of hydrogen peroxide and, optionally, further acidified through the addition of sulfuric acid, to ensure that residual reduced sulfur species are oxidized, so as to yield an oxidized solution 216. Due to the use of sodium throughout the process, the oxidized solution 216 has a sodium concentration that is higher than that of conventional feed solutions subjected to conventional arsenic stabilization processes. Typically, the sodium concentration of the oxidized solution 216 is at least about 10 g/L; more typically, about 30 g/L to about 70 g/L; still more typically, about 50 g/L to about 60 g/L. During both the first arsenic solution conditioning process 202 and the second arsenic solution conditioning process 212, the solution is monitored using oxidation reduction potential (ORP). Once an ORP value of greater than about 600 mV (Ag/AgCl) has been obtained, the oxidized solution 216 is combined with precipitation reagents 218 and solid 234 recycled from downstream processing, described below, in an arsenic stabilization process 220, so as to yield a stabilized arsenic-containing pulp 222. In this embodiment, the precipitation reagents 218 comprise sulfuric acid ($H_2SO_4$) having a concentration of about 93% to about 98%, a ferric sulfate ($Fe_2(SO_4)_3$) solution having a concentration by weight of about 40% to about 50%, and a lime ($Ca(OH)_2$) slurry formed by reacting about 75% to about 95% calcium oxide (CaO) solids or calcium hydroxide ($Ca(OH)_2$) solids with water. Additionally, in this embodiment, the arsenic stabilization process 220 is carried out at a temperature of about 80° C. to about 95° C., and at a pH of about 0.8 to about 1.5, in order to control precipitation morphology. The stabilized arsenic-containing pulp 222 containing from about 0.3 g/L to about 2.0 g/L soluble arsenic is then combined with arsenic polish reagents 224 and subjected to an arsenic polish process 226. In this embodiment, the arsenic polish reagents 224 comprise a ferric sulfate ($Fe_2(SO_4)_3$) solution having a concentration by weight of about 40% to about 50%, and a lime ($Ca(OH)_2$) slurry formed by reacting about 75% to about 95% calcium oxide (CaO) solids or calcium hydroxide ($Ca(OH)_2$) solids with water. Additionally, in this embodiment, the arsenic polish process 226 is carried out at a temperature of about 50° C. to about 80° C., and the arsenic polish reagents 224 are added such that the Fe:As ratio is about 3:1 to about 8:1, preferably about 5:1, and such that the pH is about 4 to about 6, preferably about 5 to about 5.5. The arsenic polish process 226 yields a pulp 228 containing less than about 5 mg/L soluble arsenic which is then subjected to solid-liquid separation 232 to yield stabilized arsenic-containing solid 234 and a liquid 236. The solid 234 is removed, and a portion of the solid 234 is returned to the arsenic stabilization process 220 to act as precipitation seed material during the arsenic stabilization process 220. Typically, the portion comprises between about 2% to about 15% by weight of the solid 234, preferably between about 5% to about 10%, and more preferably about 8%. The remaining solid is discharged to disposal 240. The solid 234 comprises stable arsenic compounds, such as ferric arsenate, that are compliant with toxic characteristic leaching procedure (TCLP) standards and are safe for disposal. The liquid 236 is substantially free of arsenic and antimony, and is also safe for disposal 240.

Figure 6:
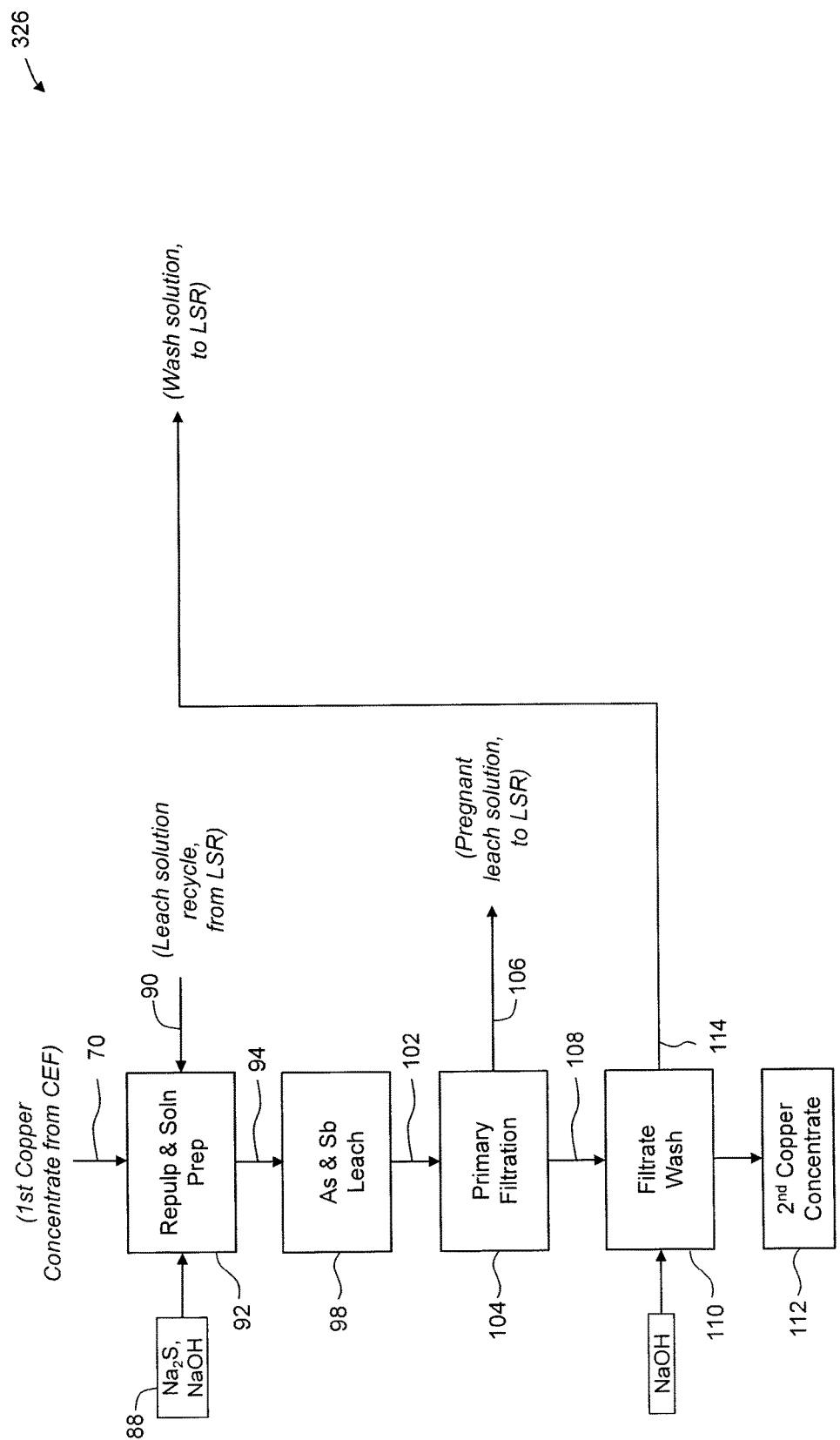
FIG. 6 is a flowchart showing another embodiment of a concentrate enrichment leach process forming part of the process for separation of metal sulfides from a mixed sulfide concentrate of FIG. 1.

Other configurations are possible. For example, FIG. 6 shows steps of another embodiment of a concentrate enrichment leaching process, which is generally indicated by reference numeral 326. Process 326 is generally similar to process 26 described above and with reference to FIG. 3. In this embodiment, the wash solution 114 from the sodium hydroxide (NaOH) filtrate wash process 110 is advanced directly to crystal dissolution 164. Additionally, in this embodiment, the leach reagents 88 are sodium sulfide ($Na_2S$) flake having complex from $.0H_2O$ to about $.9H_2O$, and sodium hydroxide (NaOH), which are combined to make a concentrated solution.

Figure 7:
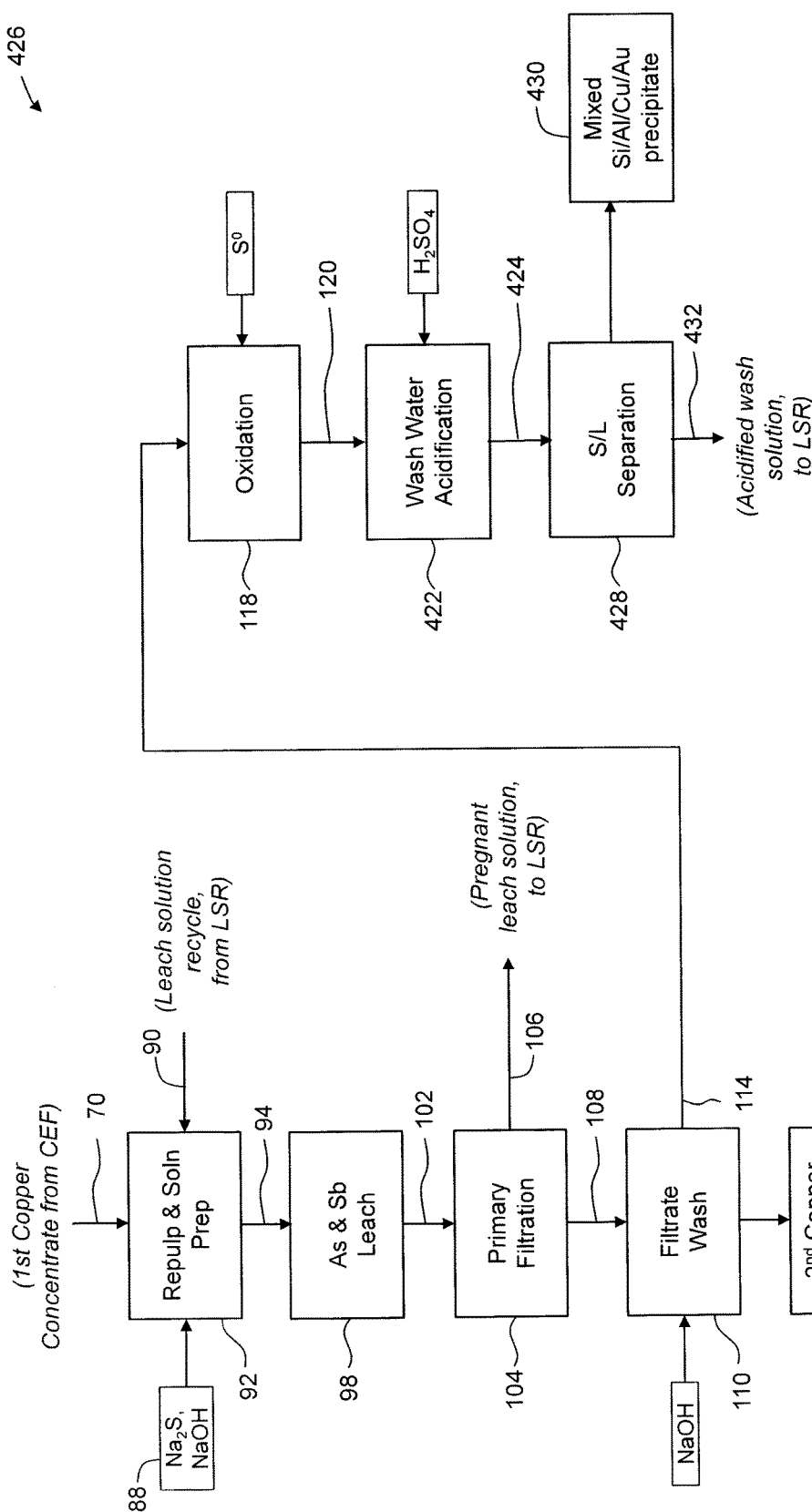
FIG. 7 is a flowchart showing still another embodiment of a concentrate enrichment leach process forming part of the process for separation of metal sulfides from a mixed sulfide concentrate of FIG. 1.

FIG. 7 shows steps of another embodiment of a concentrate enrichment leaching process, which is generally indicated by reference numeral 426. Process 426 is generally similar to process 26 described above and with reference to FIG. 3, but comprises only a single acidification step. In this embodiment, the leach reagents 88 are sodium sulfide ($Na_2S$) flake having complex from $.0H_2O$ to about $.9H_2O$, and sodium hydroxide (NaOH), which are combined to make a concentrated solution. Additionally, in this embodiment, the wash solution 114 from the filtrate wash process 110 is subjected to the oxidation process 118, in which elemental sulfur ($S^0$) is added to the wash solution 114 at an elevated temperature so as to yield the oxidized wash solution 120. The oxidation process 118 is carried out under the conditions described above, and with reference to FIG. 3. The oxidized wash solution 120 is then acidified in an acidification process 422, in which antimony, silicon, aluminum, copper and gold are precipitated to yield an acidified wash slurry 424. In this embodiment, during the acidification process 422, sulfuric acid is added to the oxidized wash solution 120 to reduce the pH to about 8.5 to about 9.0, in order to induce precipitation of the antimony, silicon, aluminum, copper and gold. The acidified wash slurry 424 is then subjected to solid-liquid separation 428 to yield a mixed antimony, silicon, aluminum, copper and gold bearing precipitate 430 and an acidified wash solution 432. The acidified wash solution 432 is advanced directly to crystal dissolution 164. The mixed antimony, silicon, aluminum, copper and gold bearing precipitate 430 may be transferred to separate processing (not shown) for recovery of gold.

In a related embodiment, the oxidation process 118 may alternatively be omitted from the process 426, in which case the wash solution 114 from the filtrate wash process 110 may alternatively be acidified in the acidification process 422.

Figure 8:
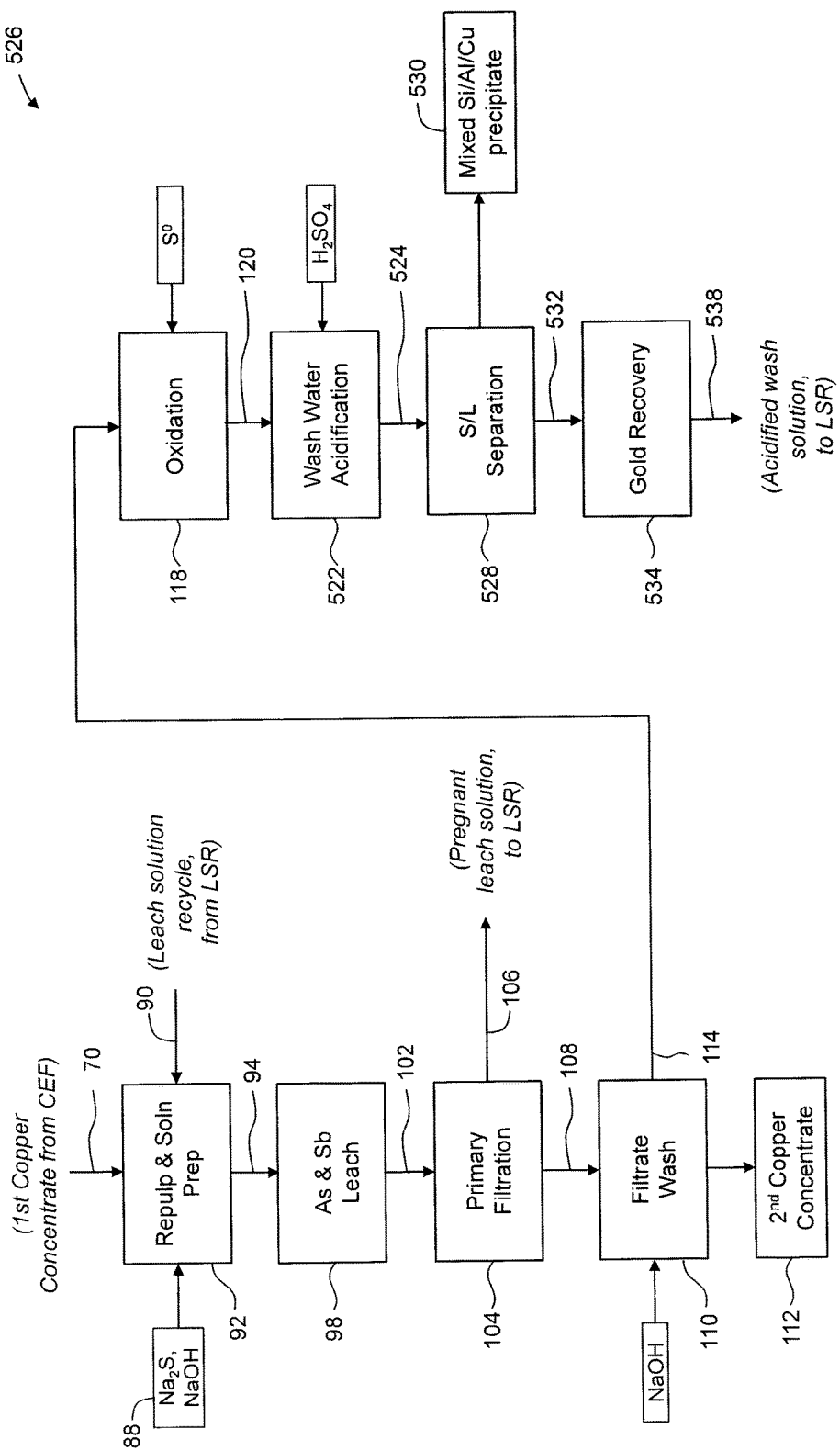
FIG. 8 is a flowchart showing still another embodiment of a concentrate enrichment leach process forming part of the process for separation of metal sulfides from a mixed sulfide concentrate of FIG. 1.

FIG. 8 shows steps of another embodiment of a concentrate enrichment leaching process, which is generally indicated by reference numeral 526. Process 526 is generally similar to process 26 described above and with reference to FIG. 3, but comprises only a single acidification step. In this embodiment, the leach reagents 88 are sodium sulfide ($Na_2S$) flake having complex from $.0H_2O$ to about $.9H_2O$, and sodium hydroxide (NaOH), which are combined to make a concentrated solution. Additionally, in this embodiment, the wash solution 114 from the filtrate wash process 110 is subjected to the oxidation process 118, in which elemental sulfur ($S^\circ$) is added to the wash solution 114 at an elevated temperature so as to yield the oxidized wash solution 120. The oxidation process 118 is carried out under the conditions described above, and with reference to FIG. 3. The oxidized wash solution 120 is then acidified in an acidification process 522, in which silicon, aluminum and copper are precipitated to yield an acidified wash slurry 524. In this embodiment, during the acidification process 522, sulfuric acid is added to the oxidized wash solution 120 to reduce the pH to about 9.0 to about 10.0, in order to induce precipitation of the silicon, aluminum and copper. The acidified wash slurry 524 is then subjected to solid-liquid separation 528 to yield a mixed silicon, aluminum and copper bearing precipitate 530 and an acidified wash solution 532. The acidified wash solution 532 is then subjected to a gold recovery process 534, during which the solution 532 is passed through a strong base ion exchange resin for extraction of gold and/or other precious metals. Acidified wash solution 538, which remains after gold recovery process 534, is then advanced directly to crystal dissolution 164.

In a related embodiment, the oxidation process 118 may alternatively be omitted from the process 526, in which case the wash solution 114 from the filtrate wash process 110 may alternatively be acidified in the acidification process 522.

Figure 9:
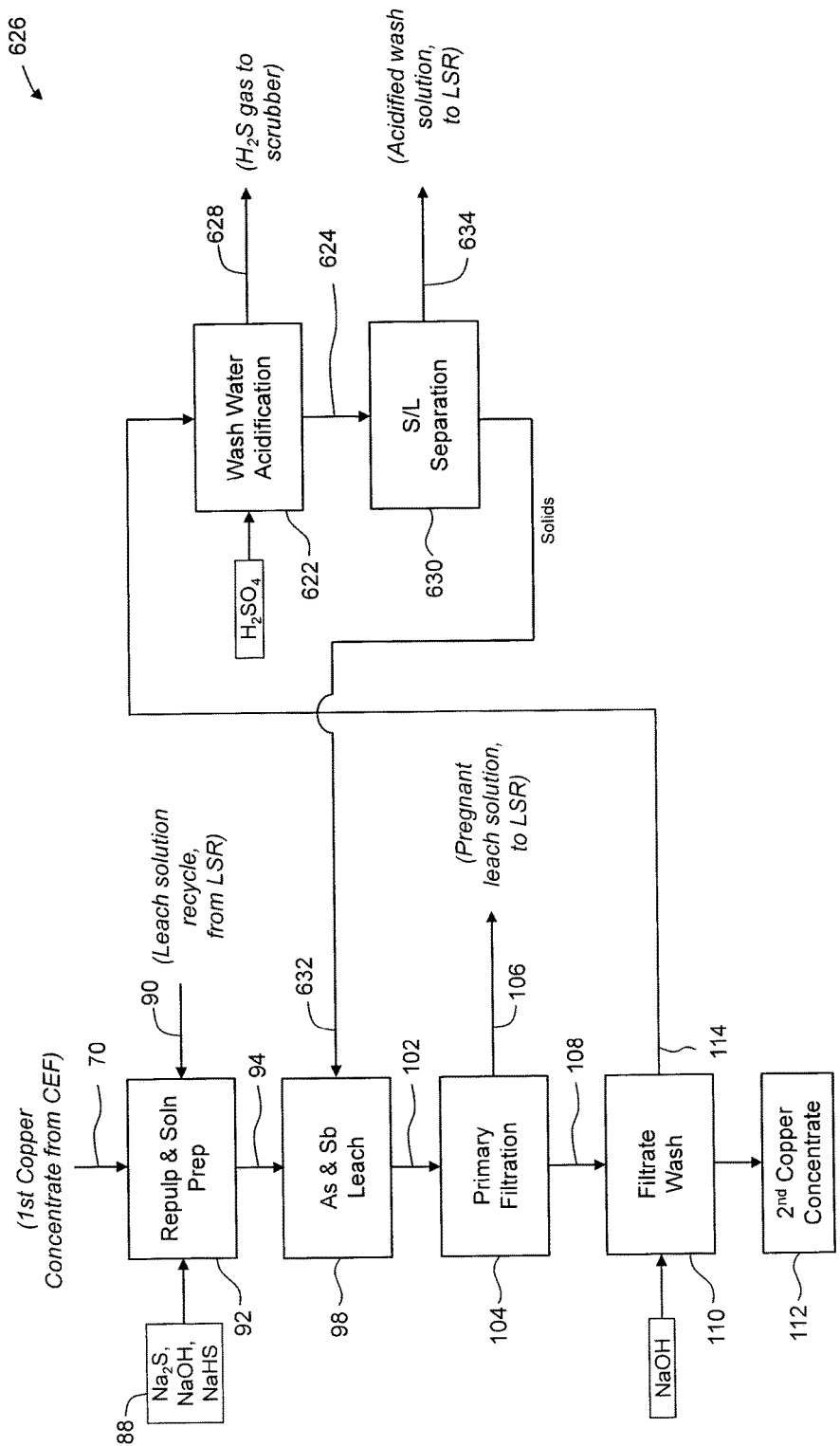
FIG. 9 is a flowchart showing still another embodiment of a concentrate enrichment leach process forming part of the process for separation of metal sulfides from a mixed sulfide concentrate of FIG. 1.

FIG. 9 shows steps of another embodiment of a concentrate enrichment leaching process, which is generally indicated by reference numeral 626. Process 626 is generally similar to process 26 described above and with reference to FIG. 3, but comprises only a single acidification step. In this embodiment, the wash solution 114 from the filtrate wash process 110 is acidified in an acidification process 622, in which arsenic, antimony, gold, copper, and other elements, are precipitated as a mixture of sulfides and other species to yield an acidified wash slurry 624, and in which hydrogen sulfide ($H_2S$) gas 628 is evolved. In this embodiment, during the acidification process 622, sulfuric acid is added to the wash solution 114 to reduce the pH to about 4.0 in order to induce precipitation of the arsenic, antimony, gold, copper, and other elements. The evolved $H_2S$ gas 628 is passed through a caustic scrubber (not shown) to yield a sodium sulfide ($Na_2S$) or a sodium hydrosulfide (NaHS) product solution, which in the embodiment shown, is combined with leach reagents 88 in the repulp/solution preparation process 92, for recycling. The acidified wash slurry 624 is then subjected to solid-liquid separation 630 to yield a mixed sulfide precipitate 632 and an acidified wash solution 634. The acidified wash solution 634 is advanced to crystal dissolution 164, and the solids 632 are combined with the leach feed pulp 94 during the leaching process 98.

In a related embodiment, the solids 632 may alternatively be advanced to the sulfide oxidation process 190, for example.

Figure 10:
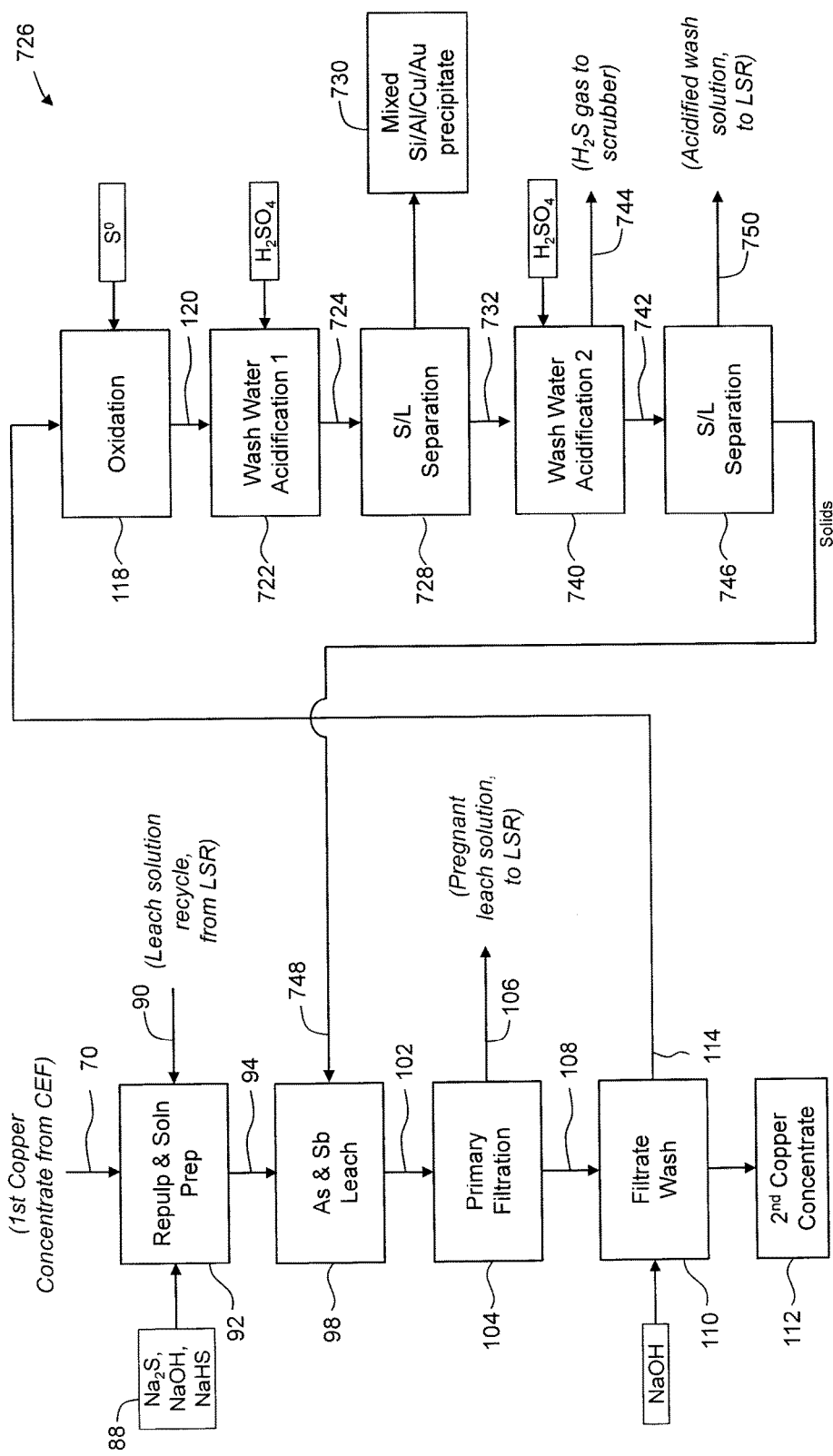
FIG. 10 is a flowchart showing still yet another embodiment of a concentrate enrichment leach process forming part of the process for separation of metal sulfides from a mixed sulfide concentrate of FIG. 1.

FIG. 10 shows steps of still another embodiment of a concentrate enrichment leaching process, which is generally indicated by reference numeral 726. Process 726 is generally similar to process 26 described above and with reference to FIG. 3, but does not comprise an in-line gold recovery process. In this embodiment, the wash solution 114 from the filtrate wash process 110 is subjected to the oxidation process 118, in which elemental sulfur)($S^\circ$ is added to the wash solution at an elevated temperature so as to yield the oxidized wash solution 120. The oxidation process 118 is carried out under the conditions described above, and with reference to FIG. 3. The oxidized wash solution 120 is then acidified in a first acidification process 722, in which silicon, aluminum, copper and gold are precipitated to yield an acidified wash slurry 724. In this embodiment, during the first acidification process 722, sulfuric acid is added to the oxidized wash solution 120 to reduce the pH to about 8.5 to about 9.0, in order to induce precipitation of the antimony, silicon, aluminum, copper and gold. The acidified wash slurry 724 is then subjected to solid-liquid separation 728 to yield a mixed antimony, silicon, aluminum, copper and gold precipitate 730 and an acidified wash solution 732. The acidified wash solution 732 is then further acidified in a second acidification process 740, in which arsenic, antimony, residual gold, copper, and other elements, are precipitated as a mixture of sulfides and other species to yield an acidified wash slurry 742, and in which hydrogen sulfide ($H_2S$) gas 744 is evolved. In this embodiment, during the second acidification process 740, sulfuric acid is added to the acidified wash solution 732 to reduce the pH to about 4.0 in order to induce precipitation of the arsenic, antimony, gold, copper, and other elements. The evolved $H_2S$ gas 744 is passed through a caustic scrubber (not shown) to yield a sodium sulfide ($Na_2S$) or sodium hydrosulfide (NaHS) product solution, which in the embodiment shown, is combined with leach reagents 88 in the repulp/solution preparation process 92, for recycling. The acidified wash slurry 742 is then subjected to solid-liquid separation 746 to yield a mixed sulfide precipitate 748 and an acidified wash solution 750. The acidified wash solution 750 is advanced to crystal dissolution 164, and the solids 748 are combined with the leach feed pulp 94 during the leaching process 98.

In a related embodiment, the oxidation process 118 may alternatively be omitted from the process 726, in which case the wash solution 114 from the filtrate wash process 110 may alternatively be acidified in the first acidification process 722.

Figure 11:
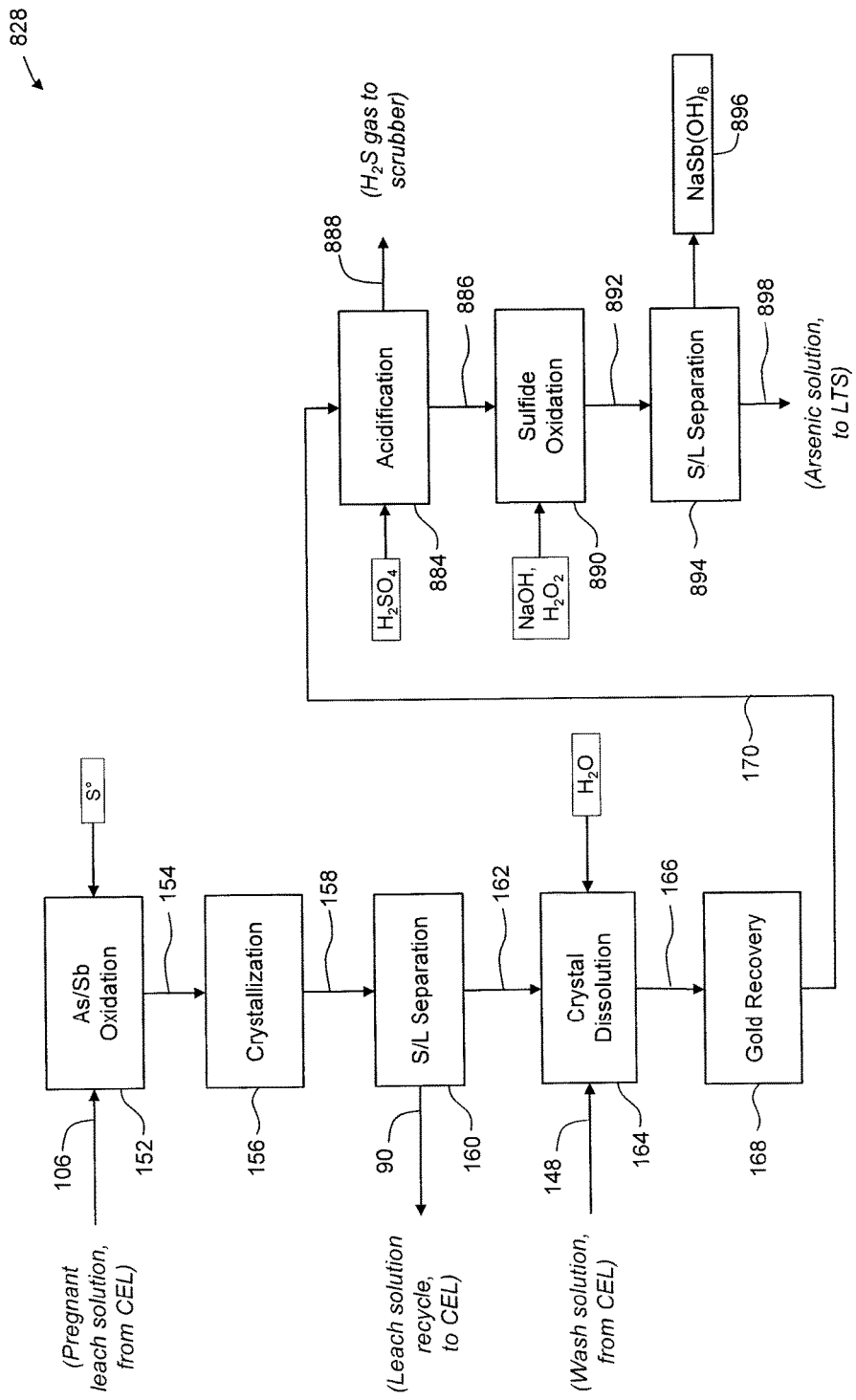
FIG. 11 is a flowchart showing another embodiment of a leach solution recovery process forming part of the process for separation of metal sulfides from a mixed sulfide concentrate of FIG. 1.

FIG. 11 shows steps of another embodiment of a leach solution recovery process, which is generally indicated by reference numeral 828. Process 828 is generally similar to process 28 described above and with reference to FIG. 4, but comprises only a single acidification process. In this embodiment, solution 170 is acidified in an acidification process 884 to precipitate generally all remaining arsenic and antimony species, so as to yield an acidified slurry 886 and to evolve hydrogen sulfide ($H_2S$) gas 888. In this embodiment, during the acidification process 884, sulfuric acid is added to the solution 170 to reduce the pH to about 4.0. The evolved $H_2S$ gas 888 is passed through a caustic scrubber (not shown) to yield a sodium sulfide ($Na_2S$) or sodium hydrosulfide (NaHS) product solution, which is combined with leach reagents 88 in the repulp/solution preparation process 92, for recycling. The acidified slurry 886 is passed through a gas stripping tower (not shown), counter current to air, to remove any dissolved $H_2S$ gas. Any $H_2S$ gas recovered from the solution is combined with the $H_2S$ gas 888 from the acidification process 884. The acidified slurry 886 is then subjected to a sulfide oxidation process 890, in which the solution is made more basic through the addition of NaOH to dissolve the arsenic and antimony sulfide precipitate in slurry 186. Hydrogen peroxide ($H_2O_2$) is then added to oxidize the dissolved thiosalts. Any suitable oxidizing agent may be used. In this embodiment, sodium hydroxide having a concentration of about 50 wt % is added until an endpoint pH of about 10.0 to about 12.0 is reached, after which hydrogen peroxide having a concentration of about 30% to about 70% is added slowly over a time sufficient to oxidize the dissolved thiosalts, which may include complete or nearly complete oxidation of the thiosalts, typically about 3 hours to about 6 hours. During the sulfide oxidation process 890, more sodium hydroxide is added to maintain the pH from about 10.0 to about 12.0 to prevent formation of elemental sulfur. The sulfide oxidation process 890 is carried out at about atmospheric pressure, and advantageously does not require use of an autoclave. The sulfide oxidation process 890 yields a slurry 892 containing predominantly solid sodium antimony hydroxide ($NaSb(OH)_6$) and soluble arsenate ($AsO_4^{-3}$). The slurry 892 is then subjected to solid-liquid separation 894 to remove solids using any combination of thickeners, filters, or other commercially available solid-liquid separation technologies, so as to yield a solid sodium antimony hydroxide product 896 and a residual solution 898. The sodium antimony hydroxide product 896 may undergo further processing to produce an antimony-containing product of suitable grade for commercial sale. The residual solution 898 is advanced to an arsenic solution conditioning process, such as the first arsenic solution conditioning process 202, for example.

Figure 12:
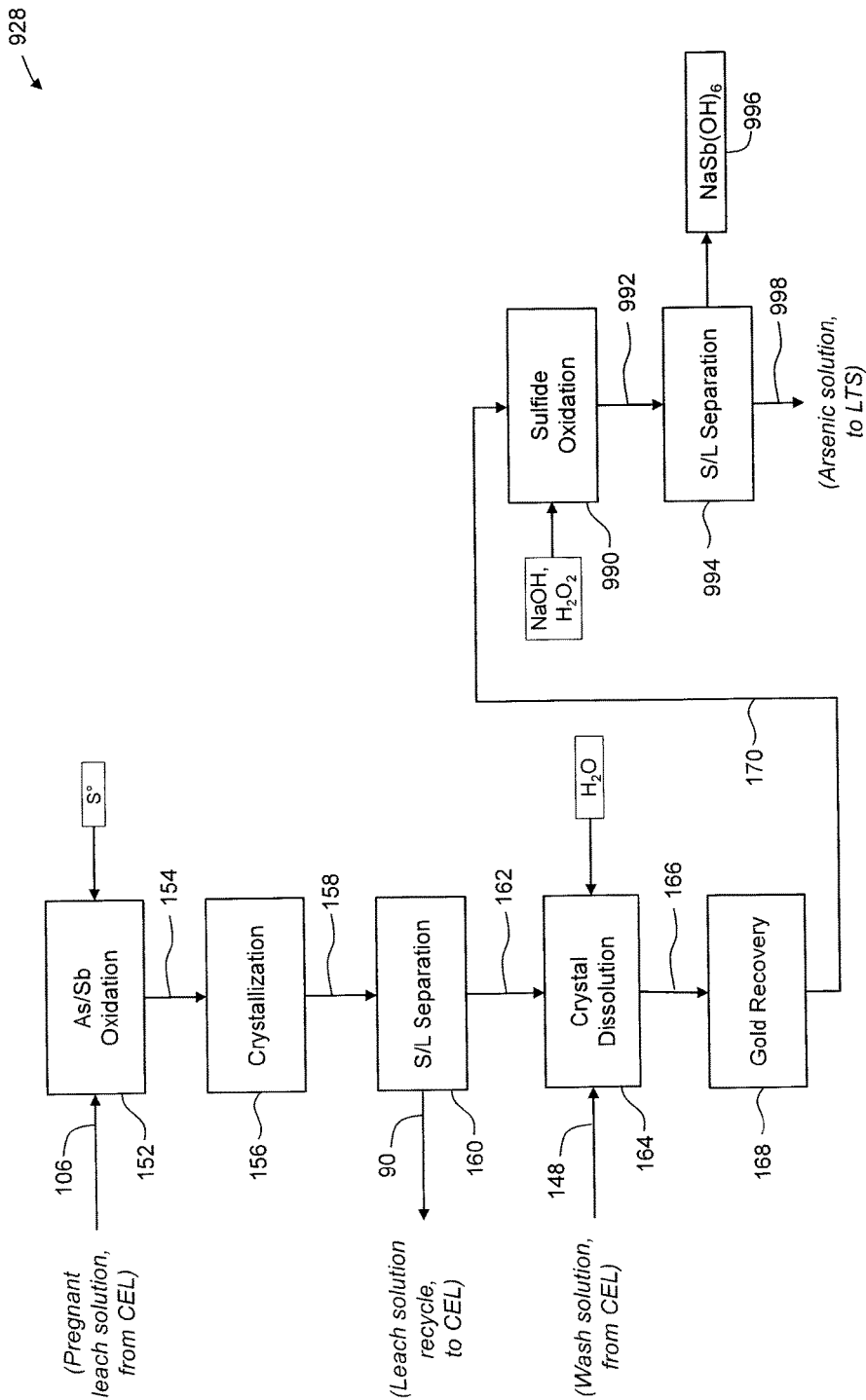
FIG. 12 is a flowchart showing still another embodiment of a leach solution recovery process forming part of the process for separation of metal sulfides from a mixed sulfide concentrate of FIG. 1.

FIG. 12 shows steps of another embodiment of a leach solution recovery process, which is generally indicated by reference numeral 928. Process 928 is generally similar to process 28 described above and with reference to FIG. 4, but does not comprise any acidification processes. In this embodiment, solution 170 is subjected to a sulfide oxidation process 990, in which sodium hydroxide solution is added to control pH so as to prevent formation of elemental sulfur and thereby avoid contamination of the solids, and hydrogen peroxide ($H_2O_2$) is added to oxidize the dissolved thiosalts. Any suitable oxidizing agent may be used. In this embodiment, sodium hydroxide having a concentration of about 50 wt % is added to control pH at about 10.0 to about 12.0, and hydrogen peroxide having a concentration of about 30% to about 70% is added slowly over a time sufficient to oxidize the dissolved thiosalts completely or nearly completely, typically about 3 hours to about 6 hours. The sulfide oxidation process 990 is carried out at about atmospheric pressure, and advantageously does not require use of an autoclave. The sulfide oxidation process 990 yields a slurry 992 containing predominantly solid sodium antimony hydroxide ($NaSb(OH)_6$) and soluble arsenate ($AsO_4^{-3}$). The slurry 992 is then subjected to solid-liquid separation 994 to remove solids using any combination of thickeners, filters, or other commercially available solid-liquid separation technologies, so as to yield a solid sodium antimony hydroxide product 996 and a residual solution 998. The sodium antimony hydroxide product 996 may undergo further processing to produce an antimony-containing product of suitable grade for commercial sale. The residual solution 998 is advanced to an arsenic solution conditioning process, such as the first arsenic solution conditioning process 202, for example.

Figure 13:
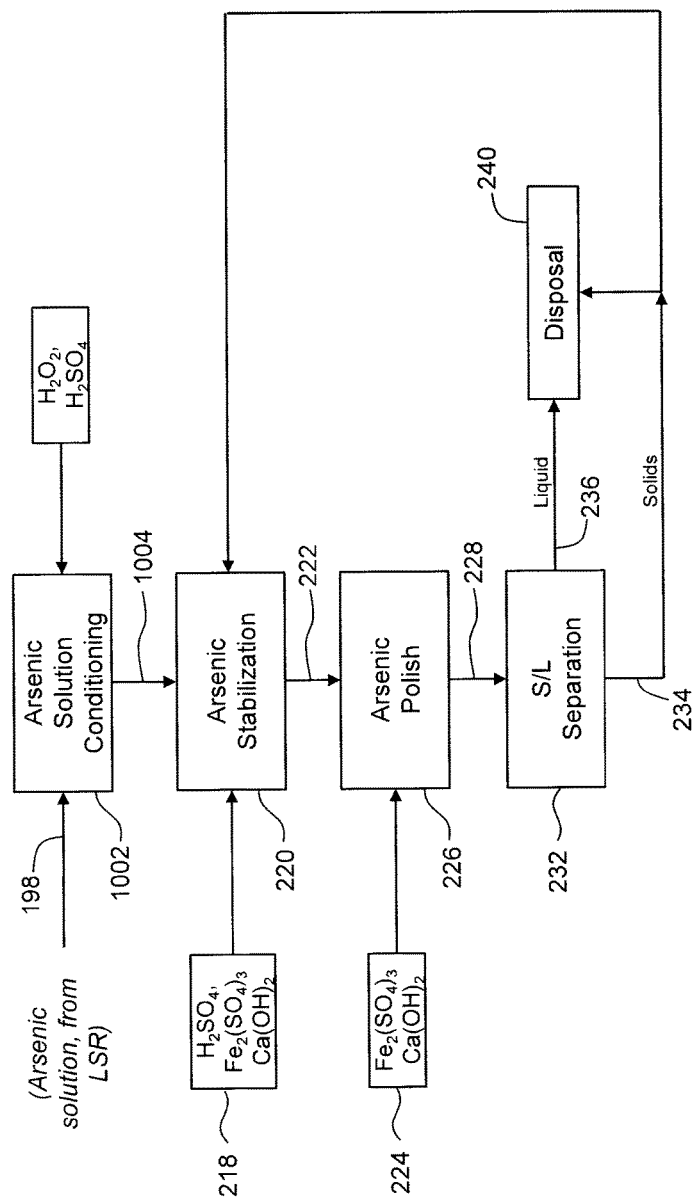
FIG. 13 is a flowchart showing another embodiment of a leach tails stabilization process forming part of the process for separation of metal sulfides from a mixed sulfide concentrate of FIG. 1.

FIG. 13 shows steps of another embodiment of a leach tails stabilization process, which is generally indicated by reference numeral 1030. Process 1030 is generally similar to process 30 described above and with reference to FIG. 5, but comprises a single arsenic solution conditioning step. In this embodiment, the residual solution 198 from the solid-liquid separation 194 is subjected to an arsenic solution conditioning process 1002, in which it is oxidized prior to pH adjustment through the addition of hydrogen peroxide to ensure that all residual arsenite ($As^{3+}$) and reduced sulfur species are fully oxidized. In this embodiment, elemental sulfur formation is limited or absent. The solution is then acidified through the addition of sulfuric acid so as to reduce the pH to about 1.5 to about 2.0, so as to yield an acidified oxidized solution 1004. Due to the use of sodium throughout the process, the oxidized solution 1004 has a sodium concentration that is higher than that of conventional feed solutions subjected to conventional arsenic stabilization processes. Typically, the sodium concentration of the acidified oxidized solution 1004 is at least about 10 g/L; more typically, about 30 g/L to about 70 g/L; still more typically, about 50 g/L to about 60 g/L. During the arsenic solution conditioning process 1002, the solution may be monitored using oxidation reduction potential (ORP), and the process may be carried out until a desired ORP value (greater than about 600 mV (Ag/AgCl) in the acidified solution), has been obtained. After the arsenic solution conditioning process 1002, the acidified oxidized solution 1004 is combined with precipitation reagents 218 and solid 234 recycled from downstream processing in the arsenic stabilization process 220, which has been described above and with reference to FIG. 5.

As will be appreciated, the process for separation of metal sulfides is not limited to that described above, and in other embodiments the process may comprise one or more of the following sub processes: the concentrate enrichment flotation process 24, the concentrate enrichment leaching process 26, the leach solution recovery process 28, and the leach tails stabilization process 30.

For example, the process comprises the concentrate enrichment flotation process 24 described above, together with one or more other sub processes for processing and/or removal of copper, antimony and/or arsenic sulfides. In another related embodiment, the process comprises the concentrate enrichment flotation process 24 and the concentrate enrichment leaching process 26 described above, together with other sub processes for processing and/or removal of antimony and/or arsenic sulfides. In another related embodiment, the process comprises the concentrate enrichment flotation process 24 and the leach solution recovery process 28 described above, together with other sub processes for processing and/or removal of copper, antimony and/or arsenic sulfides. In another related embodiment, the process comprises the concentrate enrichment flotation process 24 and the leach tails stabilization process 30 described above, together with other sub processes for processing and/or removal of copper, antimony and/or arsenic sulfides. In another related embodiment, the process comprises the concentrate enrichment flotation process 24 and any two (2) of the concentrate enrichment leaching process 26, the leach solution recovery process 28, and the leach tails stabilization process 30 described above, together with one or more other sub processes for processing and/or removal of copper, antimony and/or arsenic sulfides.

In other embodiments, the process comprises the concentrate enrichment leaching process 26 described above, together with one or more other sub processes for processing and/or removal of lead, antimony and/or arsenic sulfides. In one related embodiment, the process comprises the concentrate enrichment leaching process 26 and the leach solution recovery process 28 described above, together with other sub processes for processing and/or removal of lead, antimony and/or arsenic sulfides. In another related embodiment, the process comprises the concentrate enrichment leaching process 26 and the leach tails stabilization process 30 described above, together with other sub processes for processing and/or removal of lead, copper, antimony and/or arsenic sulfides. In another related embodiment, the process comprises the concentrate enrichment leaching process 26 and any two (2) of the concentrate enrichment flotation process 24, the leach solution recovery process 28, and the leach tails stabilization process 30 described above, together with one or more other sub processes for processing and/or removal of lead, antimony and/or arsenic sulfides.

In other embodiments, the process comprises the leach solution recovery process 28 described above, together with one or more other sub processes for processing and/or removal of lead, copper, antimony and/or arsenic sulfides. In one related embodiment, the process comprises the leach solution recovery process 28 and the leach tails stabilization process 30 described above, together with other sub processes for processing and/or removal of lead, copper, antimony and/or arsenic sulfides. In another related embodiment, the process comprises the leach solution recovery process 28 and any two (2) of the concentrate enrichment flotation process 24, the concentrate enrichment leaching process 26 and the leach tails stabilization process 30 described above, together with one or more other sub processes for processing and/or removal of lead, copper, antimony and/or arsenic sulfides.

In other embodiments, the process comprises the leach tails stabilization process 30 described above, together with one or more other sub processes for processing and/or removal of lead, copper, antimony and/or arsenic sulfides.

As will be appreciated, the process for separation of metal sulfides is not limited to the specific metal sulfide embodiments described herein, but may be applied to any suitable separation of metal sulfide(s), including at least one sulfide having at least one metal and/or at least one semi-metal with use of the suitable process step(s) described herein.

Although various conditions and reagents (e.g. acids, bases, oxidizing agents etc.) are used, various changes and modifications may be made.

For example, although in embodiments described above, hydrogen peroxide is used as an oxidizing agent, in other embodiments, other oxidizing agents may alternatively be used, such as metal catalyzed quinones, including metal catalyzed hydroquinones and any other precursors that may generate hydrogen peroxide. As an example, copper catalyzed hydroquinone may alternatively be used as an oxidizing agent instead of, or in combination with, hydrogen peroxide. Those skilled in the art will appreciate that still other oxidizing agents may be used.

Although in the embodiments described above, the leach solution is monitored during the oxidation process by colorimetry to determine the endpoint of oxidation, in other embodiments, the leach solution may alternatively be monitored by another suitable method to determine the endpoint of oxidation.

Although in the embodiments described above, the frother is methyl isobutyl carbinol, in other embodiments, any frother(s) that are known in the art, which give(s) the recovery of the desired minerals, may alternatively be used. Furthermore, blends of such frothers may also be used.

Although in the embodiments described above, the collector is a thionocarbamate, in other embodiments, any collector that provides sulfosalt (e.g. copper sulfosalt) flotation may alternatively be used. For example, alkyl thionocarbamates and/or allyl alkyl thionocarbamates, including short- and long-chained alkyl thionocarbamates and allyl alkyl thionocarbamates, may be used.

Although in the embodiments described above, the depressant is an ammonium bisulfite solution, in other embodiments, any agent that depresses the flotation of galena in the presence of sulfosalts (e.g. copper sulfosalts) may alternatively be used. Suitable depressants include sulfite salts, such as sulfites, bisulfites, and metabisulfites.

Although in the embodiments described above, the dispersant is a caustic starch solution, in other embodiments, any agent that disperses sulfides may alternatively be used. It is understood that a caustic starch solution may include naturally occurring starch and/or synthetic starch, combined with any suitable base, such as sodium hydroxide.

Although in the embodiments described above, the gold recovery process comprises using a strong base ion exchange resin for extraction of gold and/or other precious metals, in other embodiments, the gold recovery process may alternatively comprise use of a precipitation process for extraction of gold and/or other precious metals. Other known precious metal recovery processes may also be used.

Although in the embodiments described above, the solids filtered by the filtration process are subjected to a sodium hydroxide (NaOH) filtrate wash process so as to yield a wash solution, in other embodiments, the solids filtered by the filtration process may alternatively be washed with another solution or with water, so as to yield the wash solution.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. It will be understood that any aspects described as "comprising" certain components may also "consist of" or "consist essentially of," wherein "consisting of" has a closed-ended or restrictive meaning and "consisting essentially of" means including the components specified but excluding other components except for materials present as impurities, unavoidable materials present as a result of processes used to provide the components, and components added for a purpose other than achieving the technical effect of the invention.

Terms of degree such as "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

When introducing elements disclosed herein, the articles "a", "an" and "the" are intended to mean that there are one or more of the elements.

The above disclosure generally describes the present invention. A more complete understanding can be obtained by reference to the following specific Examples. The Examples are described solely for purposes of illustration and are not intended to limit the scope of the invention. Changes in form and substitution of equivalents are contemplated as circumstances may suggest or render expedient. Although specific terms have been employed herein, such terms are intended in a descriptive sense and not for purposes of limitation.

EXAMPLES

Example 1

In Examples 1 to 3, "locked cycle" flotation tests were performed to evaluate the removal and separation efficiency of arsenic and antimony containing sulfosalts from the mixed sulfide concentrate.

In this example, the test was performed on a high copper feed concentrate using four locked cycles with a rougher and three stages of cleaning. The collector was a thiocarbamate (Aero A5100), the depressant was sodium metabisulfite (SMBS), and the dispersant was a caustic starch solution.

The results of the test are shown in Table 1. About 89% of the lead reported to the lead concentrate, while about 80% of the copper, about 82% of the arsenic and about 91% of the antimony reported to the copper concentrate.

TABLE 1

| Assays | Mass, % | Cu, % | As, % | Sb, % | Pb, % |
|---|---|---|---|---|---|
| Pb—Cu bulk conc. | 100 | 30.0 | 8.3 | 7.9 | 24.2 |
| Cu conc. | 63 | 38.5 | 11.0 | 14.7 | 3.9 |
| Pb conc. | 37 | 15.7 | 4.1 | 2.3 | 51.8 |
| Distribution, % | — | Cu | As | Sb | Pb |
| Pb—Cu bulk conc. | 100 | 100 | 100 | 100 | 100 |
| Cu conc. | 63 | 80 | 82 | 91 | 11 |
| Pb conc. | 37 | 20 | 18 | 9 | 89 |

Example 2

In this example, a "locked cycle" flotation test was performed on a lower copper feed concentrate than the concentrate of Example 1, using six locked cycles with a rougher and three stages of cleaning. In this example, the collector was Aero A5100, the depressant was SMBS, and the dispersant was a caustic starch solution.

The results of this test are shown in Table 2. About 99% of the lead reported to the lead concentrate, while about 78% of the copper, about 84% of the arsenic and about 74% of the antimony reported to the copper concentrate.

TABLE 2

| Assays | Mass, % | Cu, % | As, % | Sb, % | Pb, % |
|---|---|---|---|---|---|
| Pb—Cu bulk conc. | 100 | 6.5 | 1.1 | 1.8 | 57.8 |
| Cu conc. | 14 | 35.4 | 7.5 | 12.6 | 3.6 |
| Pb conc. | 86 | 1.7 | 0.2 | 0.7 | 67.3 |
| Distribution, % | — | Cu | As | Sb | Pb |
| Pb—Cu bulk conc. | 100 | 100 | 100 | 100 | 100 |
| Cu conc. | 14 | 78 | 84 | 74 | 1 |
| Pb conc. | 86 | 22 | 16 | 26 | 99 |

Example 3

In this example, a "locked cycle" flotation test was performed on a similar feed material to Example 2, using six locked cycles with a rougher and three stages of cleaning. In this example, the collector was Aero A5100, the depressant was ammonium bisulfite, and the dispersant was a caustic starch solution.

The results of this test are shown in Table 3. About 97% of the lead reported to the lead concentrate, while about 84% of the copper, about 86% of the arsenic and about 81% of the antimony reported to the copper concentrate.

TABLE 3

| Assays | Mass, % | Cu, % | As, % | Sb, % | Pb, % |
|---|---|---|---|---|---|
| Pb—Cu bulk conc. | 100 | 6.3 | 1.2 | 3.7 | 56.2 |
| Cu conc. | 19 | 27.9 | 5.5 | 15.4 | 9.4 |
| Pb conc. | 81 | 1.2 | 0.2 | 0.8 | 62.3 |
| Distribution, % | — | Cu | As | Sb | Pb |
| Pb—Cu bulk conc. | 100 | 100 | 100 | 100 | 100 |
| Cu conc. | 19 | 84 | 86 | 81 | 3 |
| Pb conc. | 81 | 16 | 14 | 19 | 97 |

Example 4

In Examples 4 and 5, a locked cycle test was performed using repulp/solution preparation process 92, leaching process 98, filtration process 104, filtrate wash process 110, oxidation process 152, crystallization process 156, and solid-liquid separation 160, and with solution 90 being returned to the repulp/solution preparation process 92 for the next cycle. Twenty six cycles were performed in total. Two concentrate samples were used in this test, namely Concentrate 1 (cycles 1 to 18) and Concentrate 2 (cycles 19 to 26), with each concentrate sample comprising 1 kg of first copper concentrate from the concentrate enrichment flotation process 24. More specifically, Concentrate 1 was a composite sample of twelve (12) individual concentrates. The twelve (12) individual concentrates used to generate Concentrate 1 were determined to contain arsenic and antimony primarily as tetrahedrite and tennantite, with minor amounts of bournonite, freibergite, boulangerite and enargite being present. The compositions of Concentrate 1 and Concentrate 2 are provided in Table 4.

During repulp/solution preparation process 92, each concentrate was combined with about 4 kg of leach solution (specifically, fresh leach solution for the first cycle, and recycled leach solution from solid-liquid separation 160 for the subsequent cycles), to make a slurry with about 20 wt % solids. The leach solution recycled from solid-liquid separation 160 was analyzed and weighed, and the required amounts of sodium sulfide ($Na_2S \cdot 3H_2O$), sodium hydroxide (NaOH) and water were added to yield a solution containing about 120 g/L sulfide and about 40 g/L sodium hydroxide.

The slurry was then heated to about 100° C. and held at that temperature for about six hours to carry out leaching process 98. After the six hours, the slurry was filtered, and the primary filtrate was recovered and kept above about 70° C. prior to oxidation process 152. The solids were washed, during filtrate wash process 110, with about 1.5 L of water containing about 0.05 M NaOH using a two stage counter current wash procedure.

Chemical analysis results of the two composite concentrate samples are shown in Table 4. About 98% of the arsenic and about 96% of the antimony was leached from the concentrate samples.

TABLE 4

| | | Concentrate 1 | | | Concentrate 2 | | |
|---|---|---|---|---|---|---|---|
| Element | Unit | Feed | Residue | Extraction | Feed | Residue | Extraction |
| total mass | kg | 18.0 | 15.1 | 16% | 8.0 | 7.0 | 13% |

TABLE 4-continued

|  |  | Concentrate 1 | | | Concentrate 2 | | |
| --- | --- | --- | --- | --- | --- | --- | --- |
| Element | Unit | Feed | Residue | Extraction | Feed | Residue | Extraction |
| As | wt % | 7.6 | 0.13 | 98% | 6.0 | 0.14 | 98% |
| Sb | wt % | 10.2 | 0.53 | 96% | 11.1 | 0.54 | 96% |
| Cu | wt % | 29.0 | 33.8 | <5% | 30.7 | 35.6 | <5% |
| Pb | wt % | 16.1 | 18.4 | <5% | 9.5 | 11.0 | <5% |

Example 5

In this example, the primary filtrate (leach solution 106) recovered after each leach cycle in Example 4 and kept at above about 70° C., was subjected to oxidation process 152, during which elemental sulfur was added until the color changed from yellow-green to orange-red. ORP values were observed to increase by about 150 mV, which indicated that ORP could have readily been used to measure the endpoint of oxidation.

Following oxidation, the solution was cooled to about 40° C. and held at that temperature for about 30 to about 60 minutes during crystallization process 156, to allow crystallization of the soluble arsenic and antimony as sodium thioarsenate and sodium thioantimonate. For the 26 cycles performed in the test, about 19.15 kg of wet crystals were recovered assaying about 6.2 wt % arsenic and about 12.1 wt % antimony. After crystallization, the solution 90 typically assayed about 30 to about 40 g/L arsenic and about 5 to about 15 g/L antimony.

Example 6

In this example, a test was carried out in which about 200 g of crystals was dissolved in about 600 g of water, in order to determine the ability to selectively precipitate antimony sulfide ($Sb_2S_5$) from the dissolved crystals. Acid was added until precipitation was observed, at which point the solution was filtered and the precipitate analyzed. A further about 5 mL of acid was then added to the filtrate and, after a short equilibration period, the solids were again removed by filtration; this procedure was repeated until the pH dropped below about 5.0.

The results of this test are shown in Table 5. About 63% of the antimony was precipitated at an arsenic grade of about 0.5 wt %, while about 92% of the antimony was precipitated at an arsenic grade of about 1.0 wt %.

TABLE 5

|  | Sample | | | | | | | |
| --- | --- | --- | --- | --- | --- | --- | --- | --- |
|  | 1 | 2 | 3 | 4 | 5 | 6 | 7 | 8 |
| pH | 7.2 | 7.8 | 7.2 | 7.2 | 7.4 | 7.2 | 6.9 | 2.9 |
| Cum. solids mass (g) | 1.8 | 3.2 | 4.7 | 6.3 | 7.7 | 9.3 | 9.6 | 15.3 |
| Cum. As assay (wt %) | 0.37 | 0.40 | 0.44 | 0.50 | 0.57 | 0.98 | 1.25 | 16.2 |
| Cum. Sb assay (wt %) | 51.5 | 50.4 | 49.5 | 48.7 | 47.7 | 48.3 | 48.0 | 31.9 |
| Cum. As pptn (%) | 0.3 | 0.5 | 0.8 | 1.3 | 1.8 | 3.7 | 4.9 | 100 |
| Cum. Sb pptn (%) | 18.7 | 33.3 | 48.2 | 62.8 | 75.6 | 92.4 | 95.3 | 100 |

Example 7

In this example, the crystals generated in the locked cycle test of Examples 4 and 5 were subjected to first acidification process 172 to generate a sulfide precipitate containing predominantly antimony sulfide ($Sb_2S_5$). Here, about five (5) kg of wet crystal was dissolved in about 15 L of water, and the resulting solution was filtered and acidified with concentrated sulfuric acid. After completing acid addition, the slurry was sparged for about 30 minutes to remove dissolved hydrogen sulfide gas. Throughout the test, air was pulled through the reactor headspace and was released to atmosphere via a single stage scrubber filled with about 50% sodium hydroxide solution.

As the antimony started to precipitate, the pH and ORP were observed to become stable. As will be understood, the system was buffered at this pH by the $NaHS/H_2S$ equilibrium and the slow rate of acid addition. After acid had been added, the pH moved back towards about pH 7 as the system returned to equilibrium.

Following acidification, the slurry was subjected to filtration. Solids recovered after the filtration assayed about 40 wt % antimony, about 33.5 wt % sulfur, and about 1.6 wt % arsenic. Approximately 65% of the antimony and approximately 5% of the arsenic was recovered from the feed solution.

Example 8

In this example, about 200 g of crystal was dissolved in about 600 mL of water. After filtration, the solution was subjected to sulfide oxidation process 990, in which about 30% hydrogen peroxide was added to the solution until the target ORP was reached. The sulfide oxidation process was carried out both with pH control at pH of about 10, and without any pH control. The precipitate formed during each test was separated from the solution, washed and analyzed. The results are shown in Table 6. The results indicate that pH control was important in limiting elemental sulfur precipitation into the product.

TABLE 6

|  | Test #1 | Test #2 |
| --- | --- | --- |
| pH Control at 10 | No | Yes |
| Feed Solution |  |  |
| Arsenic (g/L) | 17 | 17 |
| Antimony (g/L) | 35 | 28 |
| Final Solution |  |  |
| Arsenic (g/L) | 13 | — |
| Antimony (g/L) | 0.2 | — |
| Solids Product |  |  |
| Arsenic (wt %) | 0.5 | 0.7 |
| Antimony (wt %) | 38 | 48 |
| Sulfur (wt %) | 24 | 1 |
| Sodium (wt %) | 6 | 10 |

Example 9

Prior to arsenic stabilization, the arsenic solution (solution 198) is conditioned to ensure all of the arsenic and sulfur species are fully oxidized. In this example, an arsenic solution was acidified to a pH less than about 2.0 at about 80° C. The acidification generated elemental sulfur from decomposition of thiosulfate in the solution. Hydrogen peroxide was then added to increase the ORP to above approximately 600 mV, at which point oxidation of the solution was essentially complete, and therefore that the oxidized solution was a suitable feed for the arsenic stabilization process 220.

Example 10

In this example, a continuous arsenic stabilization test was run on a solution generated by processing dissolved crystal from the locked cycle test of Examples 4 and 5 through first acidification process 172, sulfide oxidation process 190 and arsenic solution conditioning 1002. Ferric sulfate was then added to the acidified oxidized solution 1004 (hereafter the "feed solution", in this example) to achieve a ferric to arsenic molar ratio of about 1.05. Analysis of the feed solution showed about 11 g/L arsenic, about 9 g/L iron, and about 60 g/L sodium. In this example, the sodium concentration in the solution was much higher than in conventional feed solutions for conventional arsenic stabilization processes due to the existence of sodium in the crystals, and due to the further addition of sodium hydroxide throughout the process.

The test was run continuously for about 26 hours, and included three stages of arsenic precipitation followed by one stage of arsenic polish. Each stage was carried out in a respective reactor. The operating conditions were as follows:

Stage 1 precipitation: about 120 minutes retention at about 90° C., pH about 1.20 and seed concentration of about 80 g/L;

Stage 2 precipitation: about 120 minutes retention at about 90° C., pH about 1.40;

Stage 3 precipitation: about 120 minutes retention at about 90° C., pH about 1.50;

Stage 4 polish: about 60 minutes retention, with ferric sulfate solution continuously added to maintain a ferric to arsenic molar ratio of about 5 at about 60° C., pH about 5.5.

During the test, about 6.3 L of feed solution was treated. The polish slurry discharge was collected and combined with contents of the polish reactor at the end of the test, to constitute a discharge composite sample.

Solution profile sampling was conducted every two hours. The results showed consistent operation once equilibrium had been established, with the arsenic concentration being reduced from about 11 g/L in the feed solution to about 2.5 g/L in the first reactor, to about 0.9 g/L in the second reactor, to about 0.5 g/L in the third reactor. The arsenic concentration in the polish slurry discharge was less than about 2 mg/L. At the end of the test, the discharge composite sample was assayed and was found to contain about 6.4 wt % arsenic, about 6.0 wt % iron, and only about 0.2 wt % sodium. The solids passed TCLP for arsenic with an assay of less than 1.0 mg/L (target: less than about 5 mg/L).

Although embodiments have been described above with reference to the accompanying drawings, those of skill in the art will appreciate that variations and modifications may be made without departing from the scope thereof as defined by the appended claims.

The description as set forth is not intended to be exhaustive or to limit the scope of the invention. Many modifications and variations are possible in light of the above teaching without departing from the spirit and scope of the following claims. It is intended that the scope of the present invention be defined by the claims appended hereto, giving full cognizance to equivalents in all respects.

What is claimed is:

1. A process for separation of at least one metal sulfide from a mixed sulfide concentrate, the mixed sulfide concentrate having at least one sulfide comprising antimony, arsenic and at least two metals, the at least two metals comprising a first metal and a second metal, the process comprising:
subjecting the mixed sulfide concentrate to flotation in which at least one sulfide comprising antimony, arsenic and the first metal is floated and at least one sulfide comprising the second metal is depressed, the flotation yielding a first metal concentrate and a second metal concentrate,
the first metal concentrate having the at least one sulfide comprising antimony, arsenic and the first metal, and
the second metal concentrate having the at least one sulfide comprising the second metal, wherein the second metal concentrate has at least about 50 wt % of the original antimony, the arsenic, and the first metal content of the mixed sulfide concentrate removed;
leaching the first metal concentrate to yield a further metal concentrate and a leach solution, the further metal concentrate comprising the first metal and the leach solution comprising soluble antimony and soluble arsenic; and
one of:
(i) oxidizing the leach solution to yield an antimony precipitate and an arsenic solution;
(ii) oxidizing the leach solution to yield an antimony precipitate and an arsenic solution, and forming a stable arsenic compound from the arsenic solution,
wherein said oxidizing the leach solution comprises oxidizing the soluble arsenic and antimony in the leach solution to yield soluble antimony and arsenic thiosalts; and
removing the soluble antimony and arsenic thiosalts from the leach solution by crystallization, wherein said crystallization comprises forming thioarsenate and thioantimonate salts.

2. The process of claim 1, wherein the leach solution is oxidized to yield the antimony precipitate and the arsenic solution, and the stable arsenic compound is formed from the arsenic solution.

3. The process of claim 1, wherein antimony and arsenic are present in the mixed sulfide concentrate in a molar ratio of about 0.5:1 to about 1.5:1.

4. The process of claim 3, wherein antimony and arsenic are present in the mixed sulfide concentrate in a molar ratio of about 1:1.

5. The process of claim 1, wherein the mixed sulfide concentrate comprises the at least two metals, and a major amount of arsenic relative to antimony.

6. The process of claim 1, wherein the mixed sulfide concentrate comprises the at least two metals, and a major amount of antimony relative to arsenic.

7. The process of claim 1, wherein the arsenic solution has an As:Sb concentration (g/L) ratio of about 10:1 to about 500:1.

8. The process of claim 1, wherein the at least two metals are selected from the group consisting of copper, lead, silver, iron, mercury, zinc, and vanadium.

9. The process of claim 1, wherein the first metal is copper and the second metal is lead.

10. The process of claim 1, wherein said subjecting the mixed sulfide concentrate to flotation comprises using one or more of a sulfite salt and a caustic starch solution.

11. The process of claim 1, wherein the second metal concentrate has about 60 wt % to about 90 wt % of the original antimony, arsenic, and the first metal content of the mixed sulfide concentrate removed.

12. The process of claim 1, wherein the first metal concentrate has at least about 50 wt % of the original second metal content of the mixed sulfide concentrate removed.

13. The process of claim 12, wherein the first metal concentrate has about 65 wt % to about 98 wt % of the original second metal content of the mixed sulfide concentrate removed.

14. The process of claim 1, wherein the further metal concentrate has at least about 75 wt % of the original antimony and arsenic content of the mixed sulfide concentrate removed.

15. The process of claim 14, wherein the further metal concentrate has about 80 wt % to about 95 wt % of the original antimony and arsenic content of the mixed sulfide concentrate removed.

16. The process of claim 1, further comprising:
washing solids remaining after said leaching to yield a first wash solution.

17. The process of claim 16, further comprising:
acidifying the first wash solution to form a precipitate and to yield a first wash slurry; and
separating the precipitate from the first wash slurry to yield a second wash solution.

18. The process of claim 17, further comprising:
acidifying the second wash solution to precipitate arsenic and antimony species as a slurry;
separating the precipitated arsenic and antimony species; and
leaching the precipitated arsenic and antimony species with the first metal concentrate during said leaching.

19. The process of claim 17, further comprising:
prior to said acidifying, oxidizing the first wash solution so as to oxidize $As^{3+}$ to $As^{5+}$ and $Sb^{3+}$ to $Sb^{5+}$.

20. The process of claim 17, further comprising:
leaching the precipitate with the first metal concentrate during said leaching.

21. The process of claim 1, wherein said oxidizing the soluble antimony and arsenic in the leach solution comprises oxidizing with elemental sulfur.

22. The process of claim 1, further comprising determining an oxidation end point by at least one of wavelength monitoring and oxidation reduction potential (ORP) monitoring.

23. The process of claim 1, further comprising:
recovering the leach solution for recycling.

24. The process of claim 1, wherein said removing comprises cooling the leach solution to induce the crystallization.

25. The process of claim 24, wherein said cooling is controlled to avoid crystallization of alkali metal sulfide.

26. The process of claim 1, further comprising:
dissolving crystals formed by said crystallization to yield the soluble antimony and arsenic thiosalts.

27. The process of claim 26, wherein the further metal concentrate is washed to yield a wash solution, said dissolving comprises dissolving the crystals in the wash solution.

28. The process of claim 1, further comprising:
oxidizing the soluble antimony and arsenic thiosalts to yield the antimony precipitate and the arsenic solution.

29. The process of claim 28, wherein said oxidizing the soluble antimony and arsenic thiosalts comprises using an oxidizing agent.

30. The process of claim 29, wherein said oxidizing agent is hydrogen peroxide and/or a metal catalyzed hydroquinone.

31. The process of claim 28, wherein said oxidizing the soluble antimony and arsenic thiosalts is carried out at about atmospheric pressure.

32. The process of claim 28, further comprising:
prior to said oxidizing the soluble antimony and arsenic thiosalts, acidifying a solution comprising the soluble antimony and arsenic thiosalts to precipitate arsenic and antimony species as a slurry; and
dissolving the precipitated arsenic and antimony species through addition of base to the slurry,
wherein said oxidizing comprises oxidizing the dissolved arsenic and antimony species.

33. The process of claim 28, further comprising:
prior to said oxidizing the soluble antimony and arsenic thiosalts, acidifying a solution comprising the soluble antimony and arsenic thiosalts to precipitate an additional antimony sulfide product as a slurry;
separating the additional antimony sulfide product from the slurry;
acidifying the slurry to precipitate arsenic and antimony species; and
dissolving the precipitated arsenic and antimony species through addition of base to the slurry,
wherein said oxidizing comprises oxidizing the dissolved arsenic and antimony species.

34. The process of claim 33, wherein the additional antimony sulfide product comprises antimony pentasulfide.

35. The process of claim 32, wherein hydrogen sulfide gas is produced and the hydrogen sulfide gas is passed through a caustic scrubber.

36. The process of claim 35, wherein a sodium sulfide product or a sodium hydrosulfide product is formed.

37. The process of claim 36, further comprising combining the sodium sulfide product or the sodium hydrosulfide product with leach reagents during said leaching.

38. The process of claim 1, wherein said antimony precipitate comprises sodium antimony hydroxide.

39. The process of claim 1, wherein the arsenic solution comprises soluble arsenate.

40. The process of claim 1, wherein said forming further comprises:
returning a portion of the stable arsenic compound to said forming to act as precipitation seed material during said forming.

41. The process of claim 1, further comprising, prior to said forming:
acidifying the arsenic solution to decompose thiosulfates, to yield an acidified solution;
oxidizing the acidified solution to oxidize residual $As^{3+}$ to $As^{5+}$ and reduced sulfur species to sulfates, to yield a slurry comprising elemental sulfur;
separating elemental sulfur from the slurry to yield a liquid; and
oxidizing the liquid to oxidize residual reduced sulfur species, to yield an oxidized solution,
wherein said forming comprises forming the stable arsenic compound from the oxidized solution.

42. The process of claim 41, further comprising using the elemental sulfur as an oxidizing agent for said oxidizing of the leach solution.

43. The process of claim 1, further comprising, prior to said forming:
oxidizing the arsenic solution to oxidize residual $As^{3+}$ to $As^{5+}$ and reduced sulfur species to sulfates, to yield an oxidized solution; and
acidifying the oxidized solution to yield an acidified oxidized solution, wherein forming comprises forming the stable arsenic compound from the acidified oxidized solution.

44. The process of claim 1, wherein the stable arsenic compound comprises ferric arsenate.

45. The process of claim 1, wherein the stable arsenic compound is compliant with toxic characteristic leaching procedure (TCLP) standards.

46. The process of claim 1, wherein the at least one sulfide comprising antimony, arsenic and at least two metals comprises sulfosalts.

47. The process of claim 46, wherein the sulfosalts comprise at least one of sulfarsenites, sulfarsenates, sulfantimonites, sulfantimonates and sulfosalts of SnS archetype.

48. The process of claim 47, wherein the sulfosalts comprise at least one of tetrahedrite, tennantite, enargite, bournonite, famatinite, and jamesonite.

49. The process of claim 1, wherein the second metal concentrate is substantially free of antimony, arsenic and the first metal.

50. The process of claim 1, wherein the further metal concentrate is substantially free of antimony and arsenic.

51. The process of claim 41, wherein a sodium concentration of the oxidized solution is at least about 10 g/L.

52. The process of claim 51, wherein the sodium concentration of the oxidized solution is about 30 g/L to about 70 g/L.

53. The process of claim 52, wherein the sodium concentration of the oxidized solution is about 50 g/L to about 60 g/L.

54. The process of claim 43, wherein a sodium concentration of the acidified oxidized solution is at least about 10 g/L.

55. The process of claim 51, wherein the sodium concentration of the acidified oxidized solution is about 30 g/L to about 70 g/L.

56. The process of claim 52, wherein the sodium concentration of the acidified oxidized solution is about 50 g/L to about 60 g/L.

57. The process of claim 1, further comprising extracting at least one precious metal.

58. The process of claim 57, wherein said extracting comprises utilizing at least one of an ion exchange resin and a precipitation process.

59. The process of claim 57, wherein said precious metal is gold.

60. The process of claim 22, wherein the wavelength monitoring is colorimetry.

61. The process of claim 1, further comprising, prior to said forming:
   acidifying the arsenic solution to decompose thiosulfates, to yield an acidified solution; and
   oxidizing the acidified solution to oxidize residual $As^{3+}$ to $As^{5+}$ and reduced sulfur species to sulfates, to yield a slurry comprising elemental sulphur, wherein the elemental sulphur is separated and re-used as an oxidizing agent for said oxidizing of the leach solution.

* * * * *